United States Patent
Cassidy et al.

(10) Patent No.: US 11,518,843 B1
(45) Date of Patent: Dec. 6, 2022

(54) POLYMERIC MATERIALS WITH IMPROVED ENVIRONMENTAL DURABILITY

(71) Applicant: Westlake Royal Building Products Inc., Houston, TX (US)

(72) Inventors: Edward F. Cassidy, Corpus Christi, TX (US); Russell L. Hill, San Antonio, TX (US); Robert F. Rathbone, San Antonio, TX (US); Xi Zhang, San Antonio, TX (US); Ying Zhang, San Antonio, TX (US); Qi Chen, San Antonio, TX (US); Amitabha Kumar, San Antonio, TX (US)

(73) Assignee: Westlake Royal Building Products Inc., Houston, TX (US)

( * ) Notice: Subject to any disclaimer, the term of this patent is extended or adjusted under 35 U.S.C. 154(b) by 634 days.

(21) Appl. No.: 16/285,355

(22) Filed: Feb. 26, 2019

Related U.S. Application Data

(60) Provisional application No. 62/635,361, filed on Feb. 26, 2018, provisional application No. 62/635,405, filed on Feb. 26, 2018, provisional application No. 62/635,367, filed on Feb. 26, 2018.

(51) Int. Cl.
| | | |
|---|---|---|
| *C08G 18/38* | (2006.01) | |
| *C08G 18/48* | (2006.01) | |
| *C08G 18/42* | (2006.01) | |
| *C08G 18/40* | (2006.01) | |
| *C08G 18/76* | (2006.01) | |
| *C08J 9/00* | (2006.01) | |
| *C08G 18/66* | (2006.01) | |
| *C08G 18/32* | (2006.01) | |

(52) U.S. Cl.
CPC ..... *C08G 18/3893* (2013.01); *C08G 18/3206* (2013.01); *C08G 18/4018* (2013.01); *C08G 18/42* (2013.01); *C08G 18/48* (2013.01); *C08G 18/6674* (2013.01); *C08G 18/7671* (2013.01); *C08J 9/0066* (2013.01); *C08G 2110/005* (2021.01); *C08J 2375/04* (2013.01)

(58) Field of Classification Search
CPC ............ C08G 18/3206; C08G 18/3893; C08G 18/4018; C08G 18/42; C08G 18/48; C08G 18/6674; C08G 18/7671; C08G 2110/005; C08J 9/0066; C08J 2375/04
See application file for complete search history.

(56) References Cited

U.S. PATENT DOCUMENTS

| | | | |
|---|---|---|---|
| 4,062,999 A | 12/1977 | Kondo et al. | |
| 4,883,826 A | 11/1989 | Marugg et al. | |
| 5,064,876 A | 11/1991 | Hamada et al. | |
| 5,082,738 A | 1/1992 | Swofford | |
| 5,922,779 A | 7/1999 | Hickey | |
| 6,031,012 A * | 2/2000 | Nakanishi | C08J 9/12 528/95 |
| 6,486,224 B2 | 11/2002 | Lin et al. | |
| 6,602,379 B2 | 8/2003 | Li et al. | |
| 7,241,504 B2 | 7/2007 | Verborgt et al. | |
| 8,138,234 B2 | 3/2012 | Brown | |
| 10,377,868 B2 * | 8/2019 | Kumar | C08G 18/6622 |
| 2004/0229052 A1 * | 11/2004 | Ahluwalia | A47C 31/001 428/457 |
| 2009/0295021 A1 * | 12/2009 | Brown | B29C 48/832 264/211.24 |
| 2010/0116179 A1 * | 5/2010 | Baker | B32B 27/22 108/57.25 |
| 2011/0031059 A1 * | 2/2011 | Parish | A61F 11/08 181/129 |
| 2011/0198031 A1 * | 8/2011 | Burckhardt | C08G 18/12 156/331.7 |
| 2016/0002386 A1 | 1/2016 | Wolek et al. | |

FOREIGN PATENT DOCUMENTS

| | | |
|---|---|---|
| WO | WO 2011/020015 A1 | 2/2011 |
| WO | WO 2017/180154 A1 | 10/2017 |

OTHER PUBLICATIONS

Shin Etsu Silicones; KBM-403 product page (2014).*
Anater et al. "Achieving Performance and Sustainability Objectives With Biobased Polyols," *Paint & Coatings Industry*, pp. 1-8, May 2017.
Dow, "VORAPEL™ Hydrophobic Polyols for Improved Moisture and Chemical Resistance in High-Performance Case Applications," Durable Science.
Oertel et al. "Polyurethane Handbook: Chemistry, Raw Materials, Processing Application, Properties," $2^{nd}$ Edition, pp. 136-137, 182-83, and 252-53, 1994.
Wu et al. "Rheology Study in Polyurethane Rigid Foams," 2008.

* cited by examiner

*Primary Examiner* — John M Cooney
(74) *Attorney, Agent, or Firm* — Bookoff McAndrews, PLLC

(57) ABSTRACT

Polymer composite materials and methods of preparation are discussed. The composite material may comprise a polyurethane foam and a plurality of inorganic particles dispersed in the polyurethane foam. The composite material may have moisture movement properties, such that (a) a sample of the composite material having a length of 48 inches has a moisture movement of less than 0.15% along the length, and/or (b) a sample having a length of 6 inches has a moisture movement of less than 0.8% along the length, when submerged in 45° C. distilled water for 14 days.

16 Claims, 5 Drawing Sheets

POLYMERIC MATERIALS WITH IMPROVED ENVIRONMENTAL DURABILITY

CROSS-REFERENCE TO RELATED APPLICATIONS

This application claims the benefit of priority of U.S. Provisional Application Nos. 62/635,361, 62/635,405, and 62/635,367, each filed on Feb. 26, 2018, all of which are incorporated by reference herein in their entireties.

TECHNICAL FIELD

This application generally relates to polymeric materials and polymer composite materials and methods for making and using same.

BACKGROUND

The use of polymeric materials and polymer composite materials has increased as the properties of these products often match or exceed lumber. For instance, polymeric composite materials have become desirable for a variety of building uses because of their mechanical properties (e.g., superior tensile strength, impact resistance, abrasion resistance), weathering stability, and environmental friendliness. Still, these building products can have shortcomings in terms of their ability to maintain certain physical properties after exposure to moisture.

SUMMARY

The present disclosure includes composite materials and methods of making composite materials. For example, the present disclosure includes a composite material comprising a polyurethane foam, and a plurality of inorganic particles dispersed in the polyurethane foam, wherein (a) a sample of the composite material having a length of 48 inches has a moisture movement of less than 0.15% along the length, and/or (b) a sample of the composite material having a length of 6 inches has a moisture movement of less than 0.8% along the length, when submerged in 45° C. distilled water for 14 days.

According to some aspects of the present disclosure, the polyurethane foam may have a crosslink density from 0.1 mol/g to 1 mol/g. In some examples herein, the sample of the composite material having a length of 48 inches, and/or the sample of the composite material having a length of 6 inches, may have a water uptake of 1% to 10% when submerged in 45° C. distilled water for 14 days. Additionally, or alternatively, the sample of the composite material having a length of 48 inches may have a moisture movement of less than 0.10% along the length, and/or the sample of the composite material having a length of 6 inches may have a moisture movement of less than 0.6% along the length, when submerged in 45° C. distilled water for 14 days. The composite material may have a density from 10 lb/ft³ to 75 lb/ft³.

According to some examples herein, the inorganic particles may comprise fly ash. In other examples, the polyurethane foam may comprise a silane compound. The silane compound may have the structure:

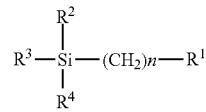

wherein $R^1$ is isocyanate, amino, epoxy (oxirane rings), sulfur (thiols), acrylate, vinyl/olefin, anhydride, carboxylic acid, hydroxyl, dipodal, imide, alkoxy, or cyano; and $R^2$, $R^3$, and $R^4$ are each independently selected from alkoxy, acyloxy, amine, chloride, and aryl groups. In other examples, the compound may be the following:

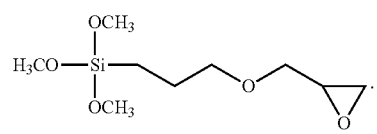 [SMILES: CO[Si](CCCOCC1CO1)(OC)OC]

In some aspects of the present disclosure, the composite material may have a fire resistance that meets the standards of at least Class B according to ASTM E-84. In some examples, the composite material may be devoid of a fire retardant.

Also disclosed herein are building materials comprising such composite materials. Exemplary building materials may be selected from the group of siding materials, cladding, trim, beadboard, building panels, sheets, architectural moldings, sound barriers, thermal barriers, insulation, wall boards, ceiling tiles, ceiling boards, soffits, roofing materials, roof tile shingles, roof cover boards, slate panels, shake panels, cast molded products, moldings, sills, stone, masonry, brick products, posts, signs, guard rails, retaining walls, park benches, tables, slats, corner arches, columns, ceiling tiles, and railroad ties.

The present disclosure further includes a composite material comprising a polyurethane foam, and a plurality of inorganic particles dispersed in the polyurethane foam, wherein (a) a sample of the composite material having a length of 48 inches has a moisture movement of less than 0.15% along the length, or (b) a sample of the composite material having a length of 6 inches has a moisture movement of less than 0.8% along the length, when submerged in 45° C. distilled water for 14 days; and wherein the composite material has a fire resistance that meets the standards of Class A according to ASTM E-84. The composite material may be devoid of a fire retardant. In some embodiments of the present disclosure, the sample of the composite material (e.g., having a length of 48 inches and/or 6 inches) may have a water uptake of 1% to 10% when submerged in 45° C. distilled water for 14 days. In other examples, the polyurethane foam may comprise a silane compound.

The present disclosure further includes a method of preparing a composite material, the method comprising combining a polyol mixture, an isocyanate, and a plurality of inorganic particles to form a reaction mixture; and foaming the reaction mixture to produce the composite material; wherein (a) a sample of the composite material having a length of 48 inches has a moisture movement of less than 0.15% along the length, and/or (b) a sample of the composite material having a length of 6 inches has a moisture movement of less than 0.8% along the length, when submerged in 45° C. distilled water for 14 days. The polyol mixture may comprise a polyester polyol having an aromaticity of 30% to 60%. The polyester polyol may be derived from phthalic anhydride; phthalic acid; isophthalic acid; terephthalic acid; methyl esters of phthalic, isophthalic, or terephthalic acid; dimethyl terephthalate; polyethylene terephthalate; trimellitic anhydride; pyromellitic dianhydride; maleic anhydride; or mixtures thereof. In some examples, the polyester polyol is present in an amount of at least 50% by weight of the polyol mixture.

BRIEF DESCRIPTION OF THE FIGURES

The accompanying drawings, which are incorporated in and constitute a part of this specification, illustrate various exemplary embodiments and together with the description, serve to explain the principles of the disclosed embodiments.

DETAILED DESCRIPTION

Figure 1:
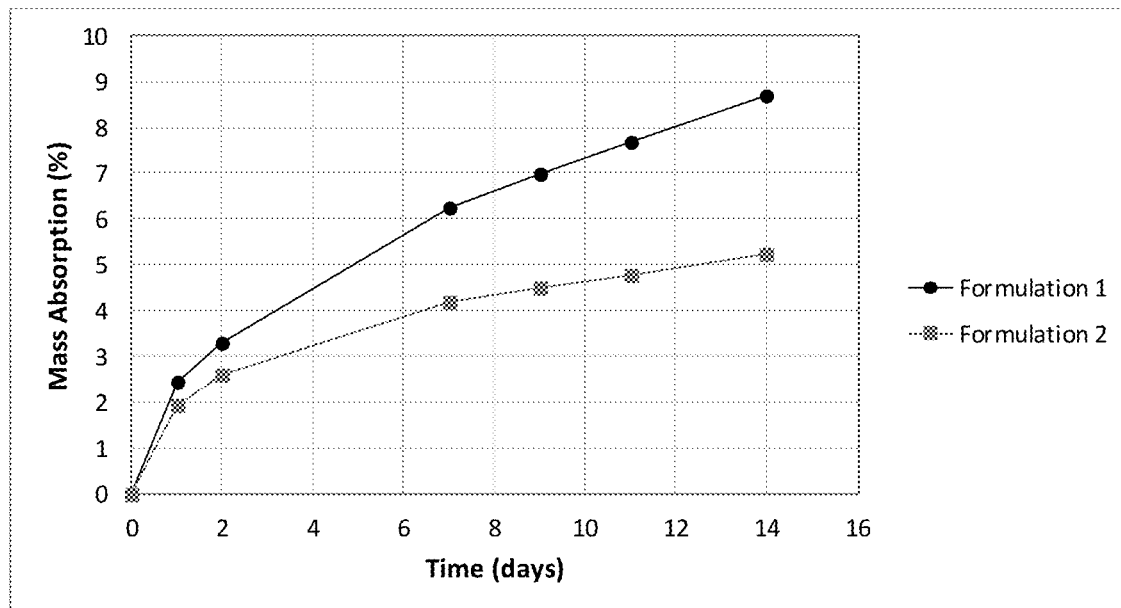
FIGS. 1-4 show results of moisture movement and dimension change for various polyurethane composite samples, as discussed in Example 1.
Figure 2:
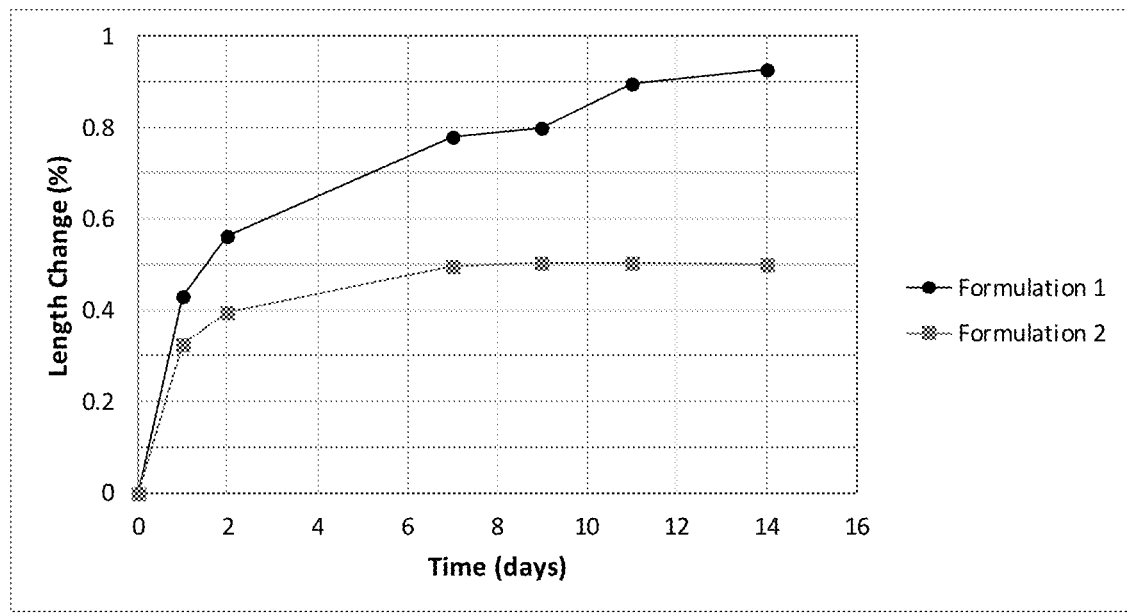
Figure 3:
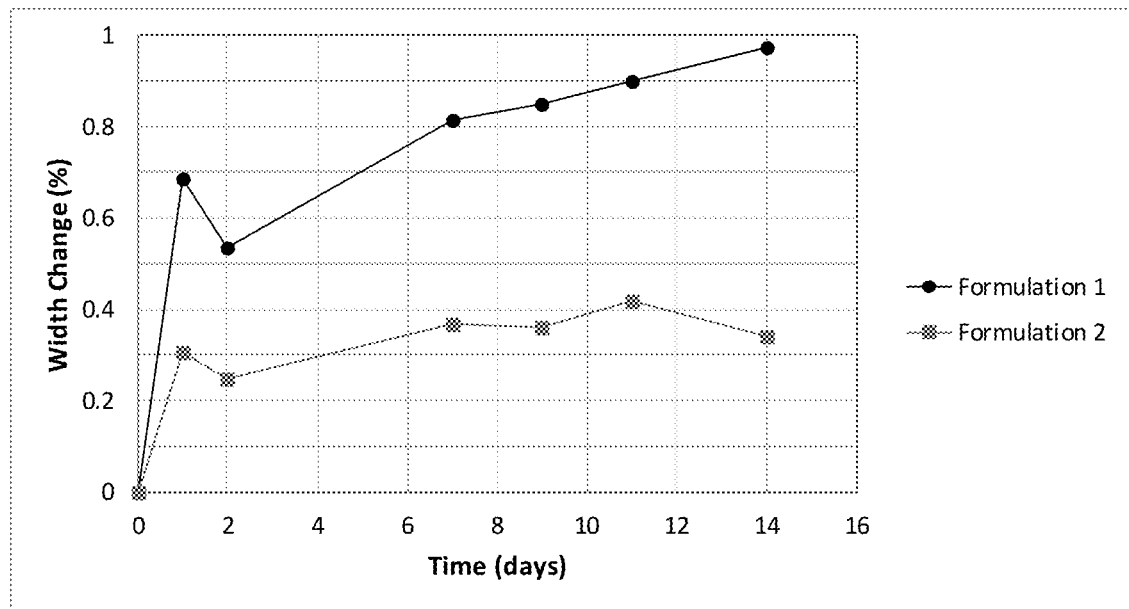
Figure 4:
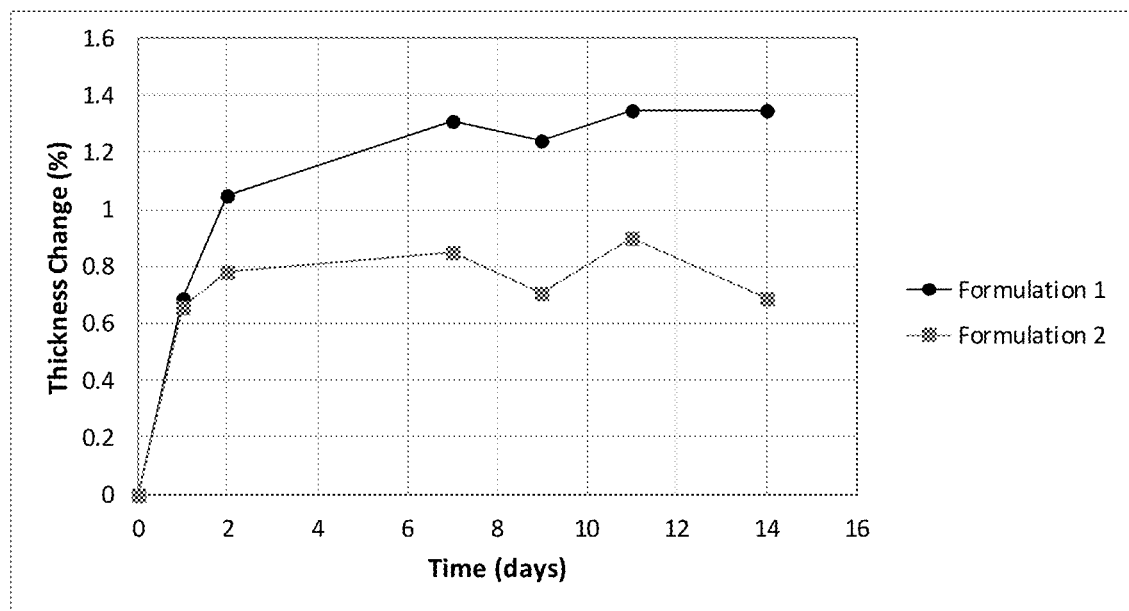

It is to be understood that the following disclosure describes several exemplary embodiments for implementing different features, structures, or functions of the present disclosure. Exemplary embodiments of components, arrangements, and configurations are described below to simplify the present disclosure; however, these exemplary embodiments are provided merely as examples and are not intended to limit the scope of the present disclosure. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure. The figures are not necessarily to scale and certain features and certain views of the figures may be shown exaggerated in scale or in schematic for clarity and/or conciseness.

The singular forms "a," "an," and "the" include plural reference unless the context dictates otherwise. The terms "approximately" and "about" refer to being nearly the same as a referenced number or value. As used herein, the terms "approximately" and "about" generally should be understood to encompass ±5% of a specified amount or value. All ranges are understood to include endpoints, e.g., a molecular weight between 250 g/mol and 1000 g/mol includes 250 g/mol, 1000 g/mol, and all values between.

Additionally, certain terms are used throughout the following description and claims to refer to particular components. As one skilled in the art will appreciate, various entities may refer to the same component by different names, and as such, the naming convention for the elements described herein is not intended to limit the scope of the present disclosure, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

The terms "up" and "down"; "upward" and "downward"; "upper" and "lower"; "upwardly" and "downwardly"; "above" and "below"; and other like terms as used herein refer to relative positions to one another and are not intended to denote a particular spatial orientation since the apparatus and methods of using the same may be equally effective at various angles or orientations.

Without wishing to be bound by theory, it is believed that moisture can be incorporated into polyurethane materials attributable to one or more of the following reasons. First, it is believed that the urethane (—NH—) bond and ester (—COO—) bond in polyurethane are both hydrophilic and thus make it easy for the polyurethane resin to absorb moisture. Second, it is believed that water can penetrate into the resin by interacting with hydrogen bonds in the polyurethane and subsequently causing an increased free volume and plasticizing of the polymer resin. Third, when the polyurethane materials are polyurethane composites, it is believed that imperfect bonding between the polymer matrix and inorganic fillers/fibers as a result of the incompatible nature of the two materials may allow moisture to penetrate into the interfacial zone and cause swelling. In building materials, moisture penetration and swelling can cause distortion and/or premature degradation, resulting in an adverse appearance and inferior structural properties. For example, the weak interfacial interaction between inorganic particles and polyurethane resin can be destroyed when moisture accumulates in the interface area and reacts with the inorganic particles to cause a large dimensional expansion. Polyester polyols have been widely used in polyurethane industry to produce high performance flexible and rigid foam. However, the hydrophilicity of ester groups is still a concern for using polyester polyols to produce polyurethane foams that will be exposed to exterior environments. The hydrolysis reaction of ester group can create acid, which can act as a catalyst for faster hydrolysis. Additionally, acids formed during hydrolysis may react with metals to form metallic salts, which can damage the interfacial between the polymer and inorganic particles in the composites. Thus, generally used polyester polyols can show poor storage stability and water resistance. The challenge is to improve the hydrophobicity of the polyurethane formulation to offer enhanced environmental durability without sacrificing other properties.

Advantageously, the present inventors have developed a polyurethane that can reduce both the moisture that is absorbed into the polyurethane resin and the expansion of the polyurethane resin when the polyurethane resin is contacted with moisture without adversely affecting the structural properties of the polyurethane resin. With addition of a coupling agent, for example a silane compound with one or more functional groups such as epoxy, amino, and/or mercapto groups, the silane compound may react with the inorganic particles and form a barrier to protect the inorganic particles from reacting with water, which may help to reduce water uptake and limit the dimensional change in the polyurethane resin. The aromaticity and low ratio of hydrolyzable groups of some embodiments of the polyurethane resin may increase the hydrophobic property of the polyurethane resin due to the pi-stacking force formed between aromatic rings making a strong internal interaction in polymer chain. The high crosslink density of exemplary polyurethane resins disclosed herein can also result in desired mechanical properties and fire performance (fire resistance).

Such polymeric materials, including composite materials, and methods of preparing the polymeric materials and composites are described herein. The polymeric materials can be, comprise, consist essentially of, or consist of polyurethane materials, and the composite materials can be, comprise, consist essentially of, or consist of polyurethane composites. The polyurethane composites can include a polyurethane foam and a plurality of inorganic particles dispersed in the polyurethane foam, wherein (a) a sample of the polyurethane foam having a length of 48 inches has a moisture movement of less than 0.15% along the length, and/or (b) a sample of the polyurethane foam having a length of 6 inches has a moisture movement of less than 0.8% along the length, when submerged in 45° C. distilled water for 14 days. The polyurethane composite can include a polyurethane, wherein (a) a sample of the polyurethane composite having a length of 48 inches has a moisture movement of less than 0.15% along the length, and/or (b) a sample of the polyurethane foam having a length of 6 inches has a moisture movement of less than 0.8% along the length, when submerged in 45° C. distilled water for 14 days.

According to some examples herein, the moisture movement (length) of the polyurethane composite (a sample having a length of 48 inches) can be less than 0.25%, 0.20%, 0.15%, 0.14%, 0.13%, 0.12%, 0.11%, 0.10%, 0.09%, 0.08%, 0.07%, 0.06%, 0.05%, 0.04%, 0.03%, 0.02%, or 0.01%. For example, the moisture movement (length) of the polyurethane composite can be from 0.15% to 0.01%, from 0.15% to 0.03%, from 0.15% to 0.04%, from 0.15% to 0.05%, from 0.15% to 0.07%, from 0.10% to 0.01%, from 0.10% to 0.03%, from 0.10% to 0.04%, from 0.10% to 0.05%, from 0.10% to 0.07%, from 0.07% to 0.01%, from 0.07% to 0.03%, from 0.07% to 0.04%, from 0.07% to 0.05%, from 0.05% to 0.01%, from 0.05% to 0.02%, or from 0.05% to 0.03%.

For example, the moisture movement (length) of the polyurethane foam can be less than 0.25%, 0.20%, 0.15%, 0.14%, 0.13%, 0.12%, 0.11%, 0.10%, 0.09%, 0.08%, 0.07%, 0.06%, 0.05%, 0.04%, 0.03%, 0.02%, or 0.01%. The moisture movement (length) of the polyurethane foam can be from 0.15% to 0.01%, from 0.15% to 0.03%, from 0.15% to 0.04%, from 0.15% to 0.05%, from 0.15% to 0.07%, from 0.10% to 0.01%, from 0.10% to 0.03%, from 0.10% to 0.04%, from 0.10% to 0.05%, from 0.10% to 0.07%, from 0.07% to 0.01%, from 0.07% to 0.03%, from 0.07% to 0.04%, from 0.07% to 0.05%, from 0.05% to 0.01%, from 0.05% to 0.02%, or from 0.05% to 0.03%.

Further, for example, the moisture movement (length) of the polyurethane composite can be less than 0.25%, 0.20%, 0.15%, 0.14%, 0.13%, 0.12%, 0.11%, 0.10%, 0.09%, 0.08%, 0.07%, 0.06%, 0.05%, 0.04%, 0.03%, 0.02%, or 0.01%. The moisture movement (length) of the polyurethane composite can be from 0.15% to 0.01%, from 0.15% to 0.03%, from 0.15% to 0.04%, from 0.15% to 0.05%, from 0.15% to 0.07%, from 0.10% to 0.01%, from 0.10% to 0.03%, from 0.10% to 0.04%, from 0.10% to 0.05%, from 0.10% to 0.07%, from 0.07% to 0.01%, from 0.07% to 0.03%, from 0.07% to 0.04%, from 0.07% to 0.05%, from 0.05% to 0.01%, from 0.05% to 0.02%, or from 0.05% to 0.03%.

Additionally or alternatively, the moisture movement (length) of a sample of the polyurethane composite and/or polyurethane foam having a length of 6 inches can be less than 0.8%, less than 0.7%, or less than 0.6%. For example, the moisture movement (length) of the polyurethane composite and/or polyurethane foam can be from 0.2% to 0.8%, or from 0.30% to 0.60%. Further, for example, the moisture movement (width) of the polyurethane composite and/or polyurethane foam having a length of 6 inches can be less than 0.9%, less than 0.8%, less than 0.7%, less than 0.6%, or less than 0.5%. For example, the moisture movement (width) of the polyurethane composite and/or polyurethane foam can be from 0.2% to 0.9%, 0.2% to 0.7%, or 0.2% to 0.4%. The moisture movement (thickness) of the polyurethane composite and/or polyurethane foam having a length of 6 inches can be less than 1.2%, less than 1.0%, or less than 0.8%. For example, the moisture movement (thickness) of the polyurethane composite and/or polyurethane foam can be from 0.2% to 1.2%, or 0.5% to 0.8%.

Additionally or alternatively, the water uptake of the polyurethane composite can be less than 20%, 15%, 10%, 9%, 8%, 7%, 6%, 5%, 4%, 3%, 2%, or 1%. For example, the water uptake of the polyurethane composite can be greater than 20%, 15%, 10%, 9%, 8%, 7%, 6%, 5%, 4%, 3%, 2%, or 1%. The water uptake of the polyurethane composite can be 20% to 1%, 20% to 5%, 20% to 7%, 20% to 10%, 15% to 1%, 15% to 5%, 15% to 7%, 15% to 10%, 0.10% to 0.04%, 0.10% to 0.05%, 0.10% to 0.07%, 0.07% to 0.03%, 0.07% to 0.04%, or 0.07% to 0.05%.

The water uptake of the polyurethane foam can be less than 20%, 15%, 10%, 9%, 8%, 7%, 6%, 5%, 4%, 3%, 2%, or 1%. The water uptake of the polyurethane foam can be greater than 20%, 15%, 10%, 9%, 8%, 7%, 6%, 5%, 4%, 3%, 2%, or 1%. The water uptake of the polyurethane foam can be 20% to 1%, 20% to 5%, 20% to 7%, 20% to 10%, 15% to 1%, 15% to 5%, 15% to 7%, 15% to 10%, 0.10% to 0.04%, 0.10% to 0.05%, 0.10% to 0.07%, 0.07% to 0.03%, 0.07% to 0.04%, or 0.07% to 0.05%.

In some examples herein, the water uptake of the polyurethane composite can be less than 20%, 15%, 10%, 9%, 8%, 7%, 6%, 5%, 4%, 3%, 2%, or 1%. For example, the water uptake of the polyurethane composite can be greater than 20%, 15%, 10%, 9%, 8%, 7%, 6%, 5%, 4%, 3%, 2%, or 1%. The water uptake of the polyurethane can be 20% to 1%, 20% to 5%, 20% to 7%, 20% to 10%, 15% to 1%, 15% to 5%, 15% to 7%, 15% to 10%, 0.10% to 0.04%, 0.10% to 0.05%, 0.10% to 0.07%, 0.07% to 0.03%, 0.07% to 0.04%, or 0.07% to 0.05%.

The "moisture movement" and "water uptake" for the purposes of this application are measured according to the following procedure, unless otherwise specified:

Samples are collected and inspected using the protocols described in Section 4 of ASTM C1185-08(2016), unless otherwise specified.

Cut the samples to a length of 4 feet (or 6 inches, when specified herein) and a width≤12 inches and a thickness≤1 inch.

Dry each sample to constant weight in a ventilated oven at a temperature of 90±2° C. and cool to room temperature in a desiccator or desiccator-type cabinet.

Measure the length of each sample in a dial gage comparator using a standard bar of the same nominal length as the specimen for reference, or any other method capable of measuring each specimen to the nearest 0.001 in. (0.02 mm). Weigh each cooled sample separately on a scale of an accuracy of 0.5% of sample mass.

Submerge the samples for 14 days, 30 days, or 60 days in distilled water at 45±4° C. or 23±4° C. Remove each sample from the water, wipe each sample with a dry cloth.

Weigh each sample separately on a scale of an accuracy of 0.5% of sample mass. Measure the length of each specimen in a dial gage comparator or any other method capable of measuring each specimen to the nearest 0.001 in. (0.02 mm). If bowing is evident, choose a method that will record measurements on both sides of the test specimen and average the results.

The moisture movement is calculated as the change in length based on the length of the dried sample $(L)_d$ and the length of the samples after being submerged in water $(L)_s$.

$$\text{Moisture movement(length), \%} = \frac{[(L)_s - (L)_d] \times 100}{(L)_d}$$

The water uptake is calculated as the change in weight based on the weight of the dried sample $(W)_d$ and the weight of the samples after being submerged in water $(W)_s$.

$$\text{Water uptake(mass), \%} = \frac{[(W)_s - (W)_d] \times 100}{(W)_d}$$

The polyurethane composite can have a crosslink density that is at least 0.1 mol/g, at least 0.2 mol/g, at least 0.3 mol/g, at least 0.4 mol/g, at least 0.5 mol/g, at least 0.6 mol/g, at least 0.7 mol/g, at least 0.8 mol/g, at least 0.9 mol/g at least 1 mol/g. The polyurethane composite can have a crosslink density that is from 0.1 to 2 mol/g, 0.1 to 1 mol/g, 0.1 to 0.9 mol/g, 0.1 to 0.8 mol/g, 0.1 to 0.8 mol/g, 0.1 to 0.7 mol/g, 0.1 to 0.6 mol/g, 0.1 to 0.5 mol/g, 0.2 to 2 mol/g, 0.2 to 1 mol/g, 0.2 to 0.9 mol/g, 0.2 to 0.8 mol/g, 0.2 to 0.8 mol/g, 0.2 to 0.7 mol/g, 0.2 to 0.6 mol/g, 0.2 to 0.5 mol/g, 0.1 to 2 mol/g, 0.3 to 1 mol/g, 0.3 to 0.9 mol/g, 0.3 to 0.8 mol/g, 0.3 to 0.8 mol/g, 0.3 to 0.7 mol/g, 0.3 to 0.6 mol/g, 0.3 to 0.5 mol/g, 0.4 to 2 mol/g, 0.4 to 1 mol/g, 0.4 to 0.9 mol/g, 0.4 to 0.8 mol/g, 0.4 to 0.8 mol/g, 0.4 to 0.7 mol/g, or 0.4 to 0.6 mol/g. The crosslink density can be measured as described in CPI 2008 paper "Rheology Study in Polyurethane Rigid Foams" by Lifeng Wu, Janine Van Gemert, Rafael E. Camargo.

The density of the polyurethane composites described herein can be 5 lb/ft³ or greater. For example, the density of the polyurethane composite can be from 10 lb/ft³ to 75 lb/ft³, from 40 lb/ft³ to 75 lb/ft³, from 45 lb/ft³ to 70 lb/ft³, from 5 lb/ft³ to 60 lb/ft³, from 10 lb/ft³ to 60 lb/ft³, from 35 lb/ft³ to 50 lb/ft³, from 35 lb/ft³ to 60 lb/ft³, from 5 lb/ft³ to 30 lb/ft³, from 10 lb/ft³ to 35 lb/ft³, from 15 lb/ft³ to 35 lb/ft³ or from 20 lb/ft³ to 40 lb/ft³. In some embodiments, the density of the polyurethane composite can be at least 10 lb/ft³.

The flexural strength of the polyurethane composites described herein can be 200 psi or greater. For example, the flexural strength of the composites can be 300 psi or greater, 500 psi or greater, 750 psi or greater, 900 psi or greater, 1,000 psi or greater, 1,100 psi or greater, or 1,200 psi or greater. In some embodiments, the flexural strength of the polyurethane composites can be from 900 to 2,000 psi or from 900 to 1,500 psi. The flexural strength can be determined by the load required to fracture a rectangular prism loaded in the three point bend test as described in ASTM C1185-08 (2016).

The polyurethane composites can exhibit a ratio of flexural strength (in psi) to density (in lb/ft³) of from 10:1 to 200:1. In some embodiments, the polyurethane composites can exhibit a ratio of flexural strength (in psi) to density (in lb/ft³) of from 10:1 to 100:1 or from 20:1 to 100:1.

The modulus of elasticity (stiffness) of the polyurethane composites described herein can be 100 ksi or greater, 110 ksi or greater, 120 ksi or greater, 125 ksi or greater, 130 ksi or greater, 135 ksi or greater, 140 ksi or greater, or 145 ksi or greater. The modulus of elasticity can be from 110 to 200 ksi, 110 to 190 ksi, 110 to 180 ksi, 110 to 170 ksi, 110 to 160 ksi, 110 to 150 ksi, 120 to 200 ksi, 120 to 190 ksi, 120 to 180 ksi, 120 to 170 ksi, 120 to 160 ksi, 120 to 150, 130 to 200 ksi, 130 to 190 ksi, 130 to 180 ksi, 130 to 170 ksi, 130 to 160 ksi, or from 130 to 150. The modulus of elasticity can be determined as described in ASTM C947-03.

The polyurethane composites can exhibit a ratio of modulus of elasticity (in ksi) to density (in lb/ft³) of from 1:1 to 10:1. In some embodiments, the polyurethane composites can exhibit a ratio of modulus of elasticity (in ksi) to density (in lb/ft³) of 1.5:1 to 10:1, 1.5:1 to 9:1, 1.5:1 to 8:1, 1.5:1 to 7:1, 1.5:1 to 6:1 or 1.5:1 to 5:1.

In some embodiments, the handleability of the polyurethane composites can be 3 in lb/in or greater, 4 in lb/in or greater, 5 in lb/in or greater, 6 in lb/in or greater or 7 in lb/in or greater. The handleability of the polyurethane composites can be from 3 in lb/in to 8 in lb/in, 3 in lb/in to 7 in lb/in, 3 in lb/in to 6 in lb/in, 3.5 in lb/in to 8 in lb/in, 3.5 in lb/in to 7 in lb/in, or 3.5 in lb/in to 6 in lb/in. The handleability can be determined by measuring the ability of the composite to be flexed during use and is calculated as 0.5×breaking load×ultimate deflection/thickness of the test specimen. The handleability of the composites can be determined using ASTM C1185-08.

The polyurethane composite can have a width of at least 2 in, at least 4 in, at least 6 in, at least 8 in, or at least 10 in. The polyurethane composite can have a width from 2 to 12 in, from 2 to 10 in, from 2 to 8 in, from 2 to 6 in, from 4 to 12 in, from 4 to 10 in, from 4 to 8 in, from 4 to 6 in, from 5 to 12 in, from 5 to 10 in, from 5 to 8 in, from 6 to 12 in, from 6 to 10 in, or from 6 to 8 in.

The polyurethane composite can have a thermal stability of at least 1.1E-5 in/in/° F.

The polyurethane composite can be resistant to mold growth when tested in accordance with American Wood Protection Association (AWPA) E24-12 "Standard Method of Evaluation the Resistance of Wood Product Surfaces to Mold Growth" (AWPA 2014).

The polyurethane composites herein may have fire resistant properties. For example, the polyurethane composite may be rated semi-combustible according to ISO 5660-2: 2002-Reaction-to-fire tests—Heat release, smoke production and mass loss rate—Part 2: Smoke production rate (dynamic measurement). In some examples, the polyurethane composite is non-combustible. Fire resistance also may be measured by cone calorimetry tests according to ASTM E-1354. For larger-scale samples suitable for use in building materials, fire resistance may be measured according to ASTM E-84, Standard Test Method for Surface Burning Characteristics of Building Materials. The polyurethane composite may meet the standards of Class A, Class B, and/or Class C of ASTM E-84 with or without the addition of a fire retardant. In some examples, the polyurethane composite does not include a fire retardant and meets the standards of Class A, Class B, or Class C of ASTM E-84.

The polyurethane composites can be formed using a polyester polyol, a Mannich polyols, or both. The polyurethane composites can be formed by the reaction of at least one isocyanate, selected from the group of diisocyanates, polyisocyanates, and mixtures thereof, a polyester polyol, and a Mannich polyol.

Isocyanates suitable for use in the polyurethane composites described herein can include one or more monomeric or oligomeric poly- or di-isocyanates. The monomeric or oligomeric poly- or di-isocyanate may include aromatic diisocyanates and polyisocyanates. The isocyanates can also be blocked isocyanates or pre-polymer isocyanates. The particular isocyanate used in the composites can be selected based on the desired properties of the composites, such as the amount of foaming, strength of bonding to the filler, wetting of the inorganic particulates in the reaction mixture, strength of the resulting composite, stiffness (elastic modulus), reactivity, and viscosity of the mixture.

An example of a useful diisocyanate is methylene diphenyl diisocyanate (MDI). Suitable MDI's include MDI monomers, MDI oligomers, and mixtures thereof. Further examples of useful isocyanates include those having NCO (i.e., the reactive group of an isocyanate) contents ranging from about 25% to about 35% by weight. Examples of useful isocyanates are found, for example, in *Polyurethane Handbook: Chemistry, Raw Materials, Processing Application, Properties*, $2^{nd}$ Edition, Ed: Gunter Oertel; Hanser/Gardner Publications, Inc., Cincinnati, Ohio, which is herein incorporated by reference. Suitable examples of aromatic polyisocyanates include 2,4- or 2,6-toluene diisocyanate, including mixtures thereof; p-phenylene diisocyanate; tetramethylene and hexamethylene diisocyanates; 4,4-dicyclohexylmethane diisocyanate; isophorone diisocyanate; 4,4-phenylmethane diisocyanate; polymethylene polyphenylisocyanate; and mixtures thereof. In addition, triisocyanates may be used, for example, 4,4,4-triphenylmethane triisocyanate; 1,2,4-benzene triisocyanate; polymethylene polyphenyl polyisocyanate; methylene polyphenyl polyisocyanate; and mixtures thereof. Suitable blocked isocyanates are formed by the treatment of the isocyanates described herein with a blocking agent (e.g., diethyl malonate, 3,5-dimethylpyrazole, methylethylketoxime, and caprolactam). In some embodiments, the isocyanate compositions used to form the composite can include those having viscosities ranging from 25 to 700 cPs at 25° C.

The average functionality of isocyanates useful with the polyurethane composites described herein can be from 1.5 to 5, 2 to 4.5, from 2.2 to 4, from 2.4 to 3.7, from 2.6 to 3.4, or from 2.8 to 3.2.

The polyol(s) of the polyurethane composites herein can include, for example, polyester polyols, polyether polyols, Mannich polyols, or mixtures thereof. Polyols or combinations of polyols useful with the polyurethanes described herein have an average functionality from 1.5 to 8.0. Useful polyols additionally may have an average functionality from 1.6 to 6.0, 1.8 to 4.0, 2.5 to 3.5, or 2.6 to 3.1, wherein the average functionality of the polyol is the average functionality of all the polyols used in the preparation of the polyurethane. The average hydroxyl number values for polyols useful with the polyurethanes described herein include hydroxyl numbers from 100 to 600, 150 to 550, 200 to 500, 250 to 440, 300 to 415, and 340 to 400, wherein the average hydroxy number of the polyol is the average hydroxy number of all the polyols used in the preparation of the polyurethane. The polyol can include more than one polyol. For example, the polyurethane composites herein may be prepared from a polyol mixture that includes at least a polyester polyol and a Mannich polyol.

The polyol(s) can include one or more plant-based polyols. The use of plant-based polyols increases the environmental content of the composite materials. The one or more plant-based polyols can include castor oil. Castor oil is described, for example, in Encyclopedia of Chemical Technology, Volume 5, John Wiley & Sons (1979).

The one or more plant-based polyols described herein can include polyols containing ester groups that are derived from plant-based fats and oils. Accordingly, the one or more plant-based polyols can contain structural elements of fatty acids and fatty alcohols. Starting materials for the plant-based polyols of the polyurethane component include fats and/or oils of plant-based origin with preferably unsaturated fatty acid residues. The one or more plant-based polyols useful with the polyurethane composites described herein can include, for example, castor oil; coconut oil; corn oil; cottonseed oil; *lesquerella* oil; linseed oil; olive oil; palm oil; palm kernel oil; peanut oil; sunflower oil; tall oil; and mixtures thereof. In some embodiments, the one or more plant-based polyols can be derived from soybean oil as the plant-based oil.

The one or more polyols can include highly reactive polyols that include a large number of primary hydroxyl groups (e.g. 75% or more or 80% or more) as determined using fluorine NMR spectroscopy as described in ASTM D4273. Such highly reactive polyols can have a primary hydroxyl number, defined as the hydroxyl number multiplied by the percentage of primary hydroxyl groups based on the total number of hydroxyl groups, of greater than 250. In some embodiments, the highly reactive plant-based polyols can be formed by the reaction of a soybean oil and a polyester to produce a plant-based polyester polyol. Polyester polyols can be prepared using recyclable polyester to further increase the recyclable content of an organic layer. In some embodiments, the soybean oil and polyester based polyol can be prepared using recycled polyester. The polyol(s) can include renewable and recyclable content.

The castor oil component when combined with a highly reactive polyol also may provide benefits such as increased resiliency, toughness, and/or handleability. The castor oil and highly reactive polyol can be combined in various percentages, e.g., 15-40% of the castor oil and 60-85% of the highly reactive polyol. The castor oil also can provide a polyurethane foam product that is harder to break and thus that can be used for more demanding applications.

The polyols useful for the polyurethane composites herein may have a desired hydrophobicity. Hydrophobicity is believed to relate to the backbone structure of the polyol, e.g., the carbon chain length. Hydrophobicity may be increased when hydrocarbon chain moieties become an integral part of the backbone structure of the polyol and corresponding composite polymeric materials. Hydrophobicity is generally greater for longer chain length, e.g., long aliphatic chain of fatty acid polyols, the absence of ester bonds (hydrolyzable), and fewer ether oxygen atoms. Without intending to be bound by theory, it is believed that polyols with relatively higher hydrophobicity may provide for higher water resistance and/or less moisture sensitivity during cure with isocyanate for increased durability of the final polyurethane system. Hydrophobic polyols additionally may be aromatic and/or may originate from bio-based sources such as natural oils.

Polyester polyols suitable for use in the polyurethane composites described herein can include an aromatic polyester polyol. The aromatic polyester polyol can have an aromaticity that is greater than 30%, 35%, 40%, 45%, 50%, 60%. The aromatic polyester polyol can have an aromaticity that is 30% to 70%, 30% to 65%, 30% to 60%, 30% to 55%, 30% to 50%, 35% to 70%, 35% to 65%, 35% to 60%, 35% to 55%, 35% to 50%, 40% to 70%, 40% to 65%, 40% to 60%, 40% to 55%, 40% to 50%, 45% to 70%, 45% to 65%, 45% to 60%, 45% to 55%, 50% to 70%, 50% to 65%, or 50% to 60%. Further, in some examples, the polyester polyol can have an aromaticity greater than 5% and less than 30%, such as 5% to 15%, 10% to 20%, e.g., about 10%, about 12%, about 15%, about 18%, or about 20%. The aromaticity (aromatic content) of a polyol can be calculated by measuring the saponification number (for example, as described in ASTM D464-15), to determine the amount of ester in the polyols; then using this value to calculate the aromaticity based on the structure of the polyol. The aromaticity (aromatic content) can also be determined based on the amount of terephthalate (having a molecular weight of 132 g/mol) in the polyol.

Polyester polyols suitable for use in the polyurethane composites described herein can have a viscosity at 25° C. that is less than 6000 cP, less than 5000, less than 4000 cP, less than 3000 cP, less than 2000 cP. Polyester polyols suitable for use in the polyurethane composites described herein can have a viscosity at 25° C. that is 1000 to 7000 cP, 1000 to 6000 cP, 1000 to 5000 cP, 1000 to 4000 cP, 2000 to 7000 cP, 2000 to 6000 cP, 2000 to 5000 cP, 2000 to 4000 cP, 3000 to 7000 cP, 3000 to 6000 cP, 3000 to 5000 cP, or 3000 to 4000 cP, The viscosity of the composite mixture can be measured using a Brookfield Viscometer.

The polyester polyol can be the reaction product of terephthalic acid or anhydride, a polyhydroxyl compound, and an alkoxylating agent, e.g. propylene oxide, as shown below:

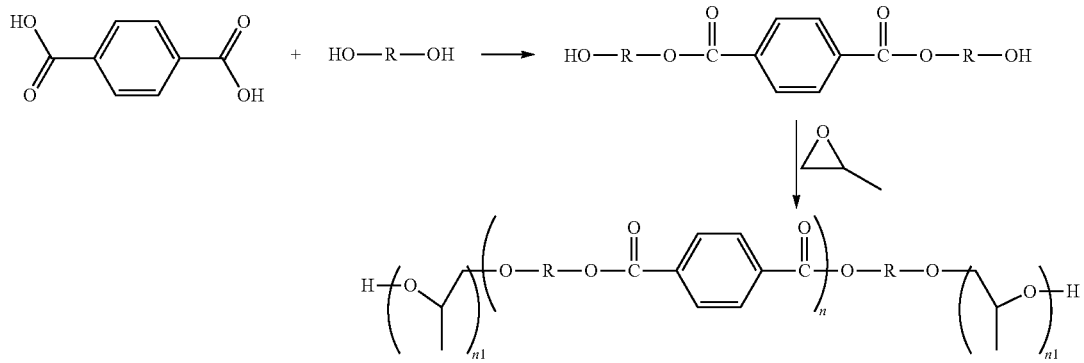

wherein R is branched or linear, saturated or unsaturated C2-10 alkyl, cycloalkyl, alkenyl, alkynal, aromatic, polyoxyethylenic, polyoxypropylenic; wherein R can contain pendant secondary functionality such as hydroxyl, aldehyde, ketone, ether, ester, amide, nitrile, amine, nitro, thiol, sulfonate, sulfate, and/or carboxylic groups; n can be from 1-200 and each n1 can independently be from 1-200. Where pendant secondary hydroxyl functionality is present, such hydroxyl groups can be alkoxylated.

Terephthalic acid or anhydride can be reacted with a polyol, i.e., a diol such as diethylene glycol to form an intermediate polyester polyol. This intermediate polyester polyol can then reacted be with an alkoxylating agent, such as propylene oxide, to form the polyester polyol.

The polyester polyol intermediates can be from the condensation of terephthalic acid or anhydride and ethylene glycol, diethylene glycol, propylene glycol, dipropylene glycol, neopentyl glycol, 1,4-butanediol, 1,6-hexanediol, polyethylene glycol, polypropylene glycol triethylene glycol, and tetramethylene glycol and mixtures thereof. The intermediate polyester polyol can be:

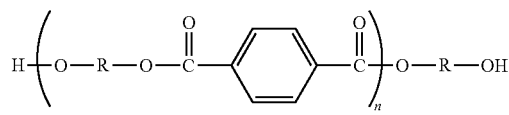

wherein R is a divalent radical selected from the group of: (a) alkylene radicals of about 2 to 10 carbon atoms; (b) radicals of the formula: —CH$_2$— R$_2$—CH$_2$— where R$_2$ is a radical selected from the group of:

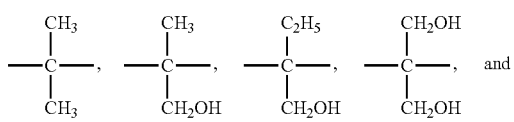

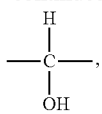

(c) radicals of the formula: —(R3O)z-R3-where R3 is an alkylene radical containing from about 2 to about 4 carbon atoms, and z is an integer of from 1 to 200; and wherein n is an integer from 1 to 200. The intermediate polyester polyol can be the polyester polyol used in the polyurethane.

The polyester polyol can be the reaction product of phthalic acid or anhydride, a polyhydroxyl compound, and an alkoxylating agent, e.g. propylene oxide, as shown below:

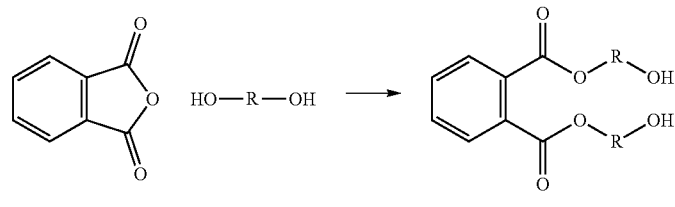

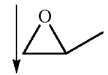

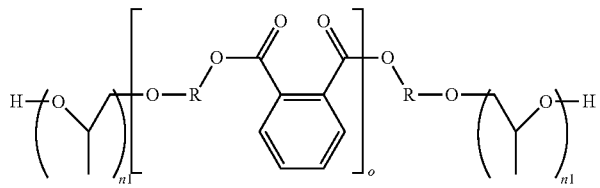

wherein R is branched or linear, saturated or unsaturated C2-10 alkyl, cycloalkyl, alkenyl, alkynl, aromatic, polyoxyethylenic, polyoxypropylenic; wherein R can contain pendant secondary functionality such as hydroxyl, aldehyde, ketone, ether, ester, amide, nitrile, amine, nitro, thiol, sulfonate, sulfate, and/or carboxylic groups; n can be from 1-200 and each n1 can independently be from 1-200. Where pendant secondary hydroxyl functionality is present, such hydroxyl groups can be alkoxylated.

Phthalic acid or anhydride can be reacted with a polyol, i.e., a diol such as diethylene glycol to form an intermediate polyester polyol. This intermediate polyester polyol can then reacted be with an alkoxylating agent, such as propylene oxide, to form the polyester polyol.

The polyester polyol intermediates can be from the condensation of phthalic acid or anhydride and ethylene glycol, diethylene glycol, propylene glycol, dipropylene glycol, neopentyl glycol, 1,4-butanediol, 1,6-hexanediol, polyethylene glycol, polypropylene glycol triethylene glycol, and tetramethylene glycol and mixtures thereof. The intermediate polyester polyol can be:

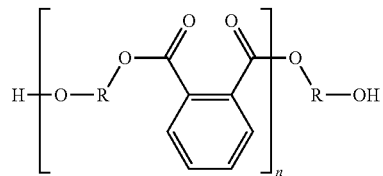

wherein R is a divalent radical selected from the group of: (a) alkylene radicals of about 2 to 10 carbon atoms; (b) radicals of the formula: —CH$_2$— R$_2$—CH$_2$— where R$_2$ is a radical selected from the group of:

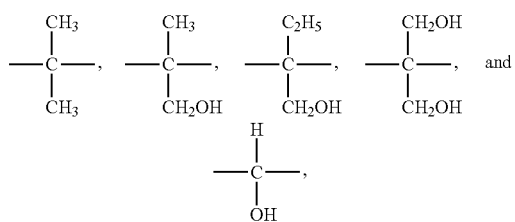

(c) radicals of the formula: —(R3O)z-R3-where R3 is an alkylene radical containing from about 2 to about 4 carbon atoms, and z is an integer of from 1 to 200; and wherein n is an integer from 1 to 200. The intermediate polyester polyol can be the polyester polyol used in the polyurethane.

The polyester polyol can be produced from phthalic acid-based material selected from the group consisting of phthalic anhydride, phthalic acid, isophthalic acid, terephthalic acid, methyl esters of phthalic, isophthalic, or terephthalic acid, dimethyl terephthalate, polyethylene terephthalate, trimellitic anhydride, pyromellitic dianhydride, maleic anhydride, or mixtures thereof.

The polyester polyol can be the reaction product of an aromatic dicarboxylic acid or anhydride, a polyhydroxyl compound, and an alkoxylating agent, e.g. propylene oxide. Further, for example, the polyester polyol can be the reaction product of an aromatic dicarboxylic acid or anhydride, an aliphatic fatty acid, such as a dibasic C9 to C34 fatty acid or derivative thereof, a polyhydroxyl compound, and an alkoxylating agent. The polyester polyol intermediates can be from the condensation of an aromatic dicarboxylic acid or anhydride and ethylene glycol, diethylene glycol, propylene glycol, dipropylene glycol, neopentyl glycol, 1,4-butanediol, 1,6-hexanediol, polyethylene glycol, polypropylene glycol triethylene glycol, and tetramethylene glycol and mixtures thereof. The aromatic dicarboxylic acid can be selected from the group of: phthalic acid, isophthalic acid, terephthalic acid, diphenic acid, and 2.6-naphthalenedicarboxylic acid. The aromatic dicarboxylic anhydride can be selected from the group of: phthalic anhydride, isophthalic anhydride, terephthalic anhydride, diphenic anhydride, and 2,6-naphthalenedicarboxylic anhydride.

The polyester polyol can be the reaction product of (a1) from about 20 to about 80 mole percent of at least one phthalic acid based material selected from the group consisting of phthalic anhydride, phthalic acid, isophthalic acid, terephthalic acid, methyl esters of phthalic, isophthalic, or terephthalic acid, dimethyl terephthalate, polyethylene terephthalate, trimellitic anhydride, pyromellitic dianhydride, maleic anhydride, or mixtures thereof or (a2) from about 20 to about 80 mole percent of a material comprising at least one phthalic acid based material and an aliphatic fatty acid or derivative thereof, the at least one phthalic acid based material being selected from the group consisting of phthalic anhydride, phthalic acid, isophthalic acid, terephthalic acid, methyl esters of phthalic, isophthalic, or terephthalic acid, dimethyl terephthalate, polyethylene terephthalate, trimellitic anhydride, pyromellitic dianhydride, maleic anhydride, or mixtures thereof; and the aliphatic fatty acid or derivative thereof being selected from the group consisting of C9 to C34 fatty acids and derivatives thereof (including, e.g., C9, C10, C11, C12, C13, C14 C15, C16 C17, C18 C19, C20, C21, C22, C23, C24, C25, C26, C27 C28 C29, C30, C31, C32, C33, and C34 dibasic fatty acids and derivatives thereof); (b) from about 20 to about 80 mole percent of at least one low molecular weight aliphatic diol of the formula:

$$HO-R_1-OH$$

herein $R_1$ is a divalent radical selected from the group of
  i) alkylene radicals each containing from 2 through 12 carbon atoms;
  ii) radicals of the formula $$-[CH_2-R_2-CH_2]-$$

wherein $R_2$ is a radical selected from the group of

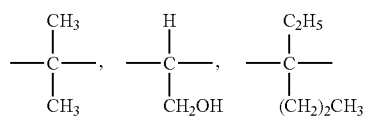

iii) radicals of the formula $$-[(R_3O)_n-R_3]-$$

wherein $R_3$ is an alkylene radical containing from 2-4 carbon atoms and n is an integer from 1 through 10; or mixtures thereof.

The reaction product of (a) and (b) above can be further reacted with (c) from about 0.1 to about 20 mole percent of a higher functional polyol of the formula:

$$HO-R_4-OH$$

wherein $R_4$ is a divalent radical selected from the group consisting of
  i) radicals of the formula $$-[CH_2-R_5-CH_2]-$$

wherein $R_5$ is a radical selected from the group consisting of

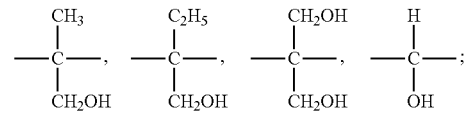

ii) radicals selected from the group consisting of glycerine, alkoxylated glycerine, sucrose, alkoxylated sucrose, methyl glucoside, alkoxylated methyl glucoside, glucose, alkoxylated glucose, fructose, alkoxylated frutose, sorbitol, alkoxylated sorbitol, lactose, and alkoxylated lactose; or mixtures thereof; and
  d) from about 0.1 to about 20 mole percent of at least one hydrophobic material characterized by:
    i) having an equivalent weight of about 130-1000;
    ii) containing from about 8 to 60 carbon atoms; and
    iii) containing at least one and not more than four radicals per molecule, which are selected from the group consisting of carboxyl, hydroxyl, and mixtures thereof.

The reaction product of (a) and (b) can also further be reacted with an alkoxylating agent (e.g. propylene oxide) to produce a polyester polyol suitable for use in the polyurethane composites.

The reaction product of (a), (b), (c), (d) can also further be reacted with an alkoxylating agent (e.g. propylene oxide) to produce a polyester polyol suitable for use in the polyurethane composites.

Mannich polyols can be the condensation product of a substituted or unsubstituted phenol, an alkanolamine, and formaldehyde. Mannich polyols can be prepared using methods known in the art. For example, Mannich polyols can be prepared by premixing the phenolic compound with a desired amount of the alkanolamine, and then slowly adding formaldehyde to the mixture at a temperature below the temperature of Novolak formation. At the end of the reaction, water can be stripped from the reaction mixture to provide a Mannich base. See, for example, U.S. Pat. No. 4,883,826, which is incorporated herein by reference in its entirety. The Mannich base can then be alkoxylated to provide a Mannich polyol.

The substituted or unsubstituted phenol can include one or more phenolic hydroxyl groups. In certain embodiments, the substituted or unsubstituted phenol includes a single hydroxyl group bound to a carbon in an aromatic ring. The phenol can be substituted with substituents which do not undesirably react under the conditions of the Mannich condensation reaction, a subsequent alkoxylation reaction (if performed), or the preparation of polyurethanes from the final product. Examples of suitable substituents include, but are not limited to, alkyl (e.g., a C1-C18 alkyl, or a C1-C12 alkyl), aryl, alkoxy, phenoxy, halogen, and nitro groups.

Examples of suitable substituted or unsubstituted phenols that can be used to form Mannich polyols include, but are not limited to, phenol, o-, p-, or m-cresols, ethylphenol, nonylphenol, dodecylphenol, p-phenylphenol, various bis-phenols including 2,2-bis(4-hydroxyphenyl)propane (bisphenol A), β-naphthol, β-hydroxyanthracene, p-chlorophenol, o-bromophenol, 2,6-dichlorophenol, p-nitrophenol, 4- or 2-nitro-6-phenylphenol, 2-nitro-6- or 4-methylphenol, 3,5-dimethylphenol, p-isopropylphenol, 2-bromo-6-cyclohexylphenol, and combinations thereof. In some embodiments, the Mannich polyol is derived from phenol or a monoalkyl phenols (e.g., a para-alkyl phenols). In some embodiments, the Mannich polyol is derived from a substituted or unsubstituted phenol selected from the group consisting of phenol, para-n-nonylphenol, and combinations thereof.

The alkanolamine used to produce the Mannich polyol can include a monoalkanolamine, a dialkanolamine, a trialkanolamine, a tetraalkanolamine, or combinations thereof. Examples of suitable monoalkanolamines include, for example, methylethanolamine, ethylethanolamine, methylisopropanolamine, ethylisopropanolamine, methyl-2-hydroxybutylamine, phenylethanolamine, ethanolamine, isopropanolamine, and combinations thereof. Suitable dialkanolamines include, for example, dialkanolamines which include two hydroxy-substituted $C_1$-C12 alkyl groups (e.g., two hydroxy-substituted $C_1$-C8 alkyl groups, or two hydroxy-substituted $C_1$-C6 alkyl groups). The two hydroxy-substituted alkyl groups can be branched or linear, and can be of identical or different chemical composition. Examples of suitable dialkanolamines include diethanolamine, diisopropanolamine, ethanolisopropanolamine, ethanol-2-hydroxybutylamine, isopropanol-2-hydroxybutylamine, isopropanol-2-hydroxyhexylamine, ethanol-2-hydroxyhexylamine, and combinations thereof. Suitable trialkanolamines include, for example, trialkanolamines which include three hydroxy-substituted C1-C12 alkyl groups (e.g., three hydroxy-substituted C1-C8 alkyl groups, or three hydroxy-substituted C1-C6 alkyl groups). The three hydroxy-substituted alkyl groups can be branched or linear, and can be of identical or different chemical composition. Examples of suitable trialkanolamines include triisopropanolamine (TIPA), triethanolamine, N,N-bis(2-hydroxyethyl)-N-(2-hydroxypropyl)amine (DEIPA), N,N-bis(2-hydroxypropyl)-N-(hydroxyethyl)amine (EDIPA), tris(2-hydroxybutyl)amine, hydroxyethyl di(hydroxypropyl)amine, hydroxypropyl di(hydroxyethyl)amine, tri(hydroxypropyl)amine, hydroxyethyl di(hydroxy-n-butyl)amine, hydroxybutyl di(hydroxypropyl)amine, and combinations thereof. Exemplary tetraalkanolamines include four hydroxy-substituted C1-C12 alkyl groups (e.g., four hydroxy-substituted C1-C8 alkyl groups, or four hydroxy-substituted C1-C6 alkyl groups). In certain embodiments, the alkanolamine is selected from the group consisting of diethanolamine, diisopropanolamine, and combinations thereof.

Any suitable alkylene oxide or combination of alkylene oxides can be used to form the Mannich polyol. In some embodiments, the alkylene oxide is selected from the group consisting of ethylene oxide, propylene oxide, butylene oxide, and combinations thereof. In certain embodiments, the Mannich polyol is alkoxylated with from 100% to about 80% propylene oxide and from 0 to about 20 wt % ethylene oxide.

The Mannich polyol can have an aromaticity that is greater than 10%, 15%, 20%, 25%, 30%, 35%. 40%, 45%, 50%, 60%. The Mannich polyol can have an aromaticity that is 10% to 70%, 10% to 60%, 10% to 50%, 10% to 40%, 10% to 30%, 15% to 70%, 15% to 60%, 15% to 50%, 15% to 40%, 15% to 30%, 20% to 70%, 20% to 60%, 20% to 50%, 20% to 40%, 20% to 30%, 30% to 70%, 30% to 65%, 30% to 60%, 30% to 55%, or 30% to 50%.

Mannich polyols suitable for use in the polyurethane composites described herein can have a viscosity at 25° C. that is less than 20000 cP, for examples less than 15000 cP, less than 10000 cP, less than 8000 cP, or less than 5000 cP. Polyester polyols suitable for use in the polyurethane composites described herein can have a viscosity at 25° C. that is 1000 to 20000 cP, e.g., 1000 to 15000 cP, 1000 to 10000 cP, 1000 to 5000 cP, 2000 to 20000 cP, 2000 to 15000 cP, 2000 to 10000 cP, 2000 to 5000 cP, 3000 to 20000 cP, 3000 to 15000 cP, 3000 to 10000 cP, or 3000 to 5000 cP.

The average functionality of Mannich polyols useful for the polyurethane composites described herein can be from 1.5 to 8, 1.5 to 7, from 1.5 to 6, from 1.5 to 5, from 1.5 to 4, from 2 to 8, 2 to 7, from 2 to 6, from 2 to 5, from 2 to 4, from 2.5 to 8, 2.5 to 7, from 2.5 to 6, from 2.5 to 5, from 2.5 to 4, from 3 to 8, 3 to 7, from 3 to 6, from 3 to 5, from 3 to 4.

According to some aspects of the present disclosure, the polyurethane composite can be formed by the reaction of a coupling agent (e.g., a silane compound), at least one isocyanate, selected from the group of diisocyanates, polyisocyanates, and mixtures herein, and a polyol or polyol mixture.

Silane compounds suitable for use in the polyurethane composites described herein include, but are not limited to, isocyanate functional silanes, amino functional silanes, epoxy functional silanes (oxirane rings), sulfur functional silanes (thiols), acrylatefunctional silanes, vinyl/olefinfunctional silanes, anhydridefunctional silanes, carboxylic acid functional silanes, hydroxylfunctional silanes, dipodal functional silanes, masked silanes, imide functional silanes, alkoxy functional silanes, polymeric silanes and cyano functional silanes. Examples of suitable silane compounds include vinyltrichlorosilane, vinyltris (Bmethoxyethoxy) silane, vinyltriethoxysilane, vinyltrimethoxysilane, 3-metacryloxypropyl-trimethoxysilane, β-(3,4 epoxycyclohexyl)-ethyltrimethoxysilane, r-glycidoxypropyl-trimethoxysilane, r-glycidoxypropyl-methylidiethoxysilane, N-β(aminoethyl)-r-aminopropyl-trimethoxysilane, N-β(aminoethyl)-r-aminopropyl-methyldimethoxysilane, 3-aminopropyl-triethoxysilane, N-phenyl-r-aminopropyl-trimethoxysilane, r-mercaptopropyl-trimethoxysilane, r-chloropropyl-trimethoxysilane, 3-glycidyloxypropyltrimethoxysilane, 3-glycidoxypropyltriethoxysilane, N-(2-aminoethyl)-3-aminopropyltrimethoxysilane, 3-(triethoxysilyl)propylsuccinic anhydride, and N-trimethoxysilylmethyl-O-methyl-carbamate, vinyltriethoxysilane, gamma-methacryloxypropyltrimethoxysilane, vinyltri(2-methoxyethoxy) silane, vinyltrimethoxysilane, vinyltrichlorosilane, gamma(meth)acryloxypropyltri(2- methoxyethoxy)silane, gamma-acryl-oxypropyltriethoxysilane, vinyltriacetoxysilane, ethynyltriethoxysilane, and 2-propynyltrichlorosilane.

The silane compound can have the general formula:

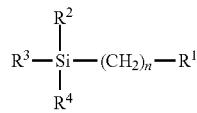

wherein $R^1$ is selected from the group isocyanate, amino, epoxy (oxirane rings), sulfur (thiols), acrylate, vinyl/olefin, anhydride, carboxylic acid, hydroxyl, dipodal, imide, alkoxy, and cyano, $R^2$ is selected from the group alkoxy, acyloxy, amine, chlorine, and aryl, $R^3$ is selected from the group alkoxy, acyloxy, amine, chlorine, and aryl, and $R^4$ is selected from the group alkoxy, acyloxy, amine, chlorine, and aryl.

In at least one example, the silane compound can be:

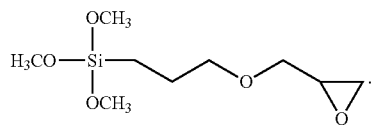 [SMILES: CO[Si](CCCOCC1CO1)(OC)OC]

The coupling agent useful for the polyurethane composites herein may be chosen from epoxide compounds. Epoxide compounds suitable for use in the polyurethane composites described herein can include unsubstituted and monosubstituted epoxides. The unsubstituted and monosubstituted epoxides can be ethylene oxide, propylene oxide, 1,2-epoxybutane; 1,2-epoxyhexane; 1,2-epoxydodecane; cyclohexyl oxirane; n-butyl glycidyl ether; tert-butyldimethylsilyl glycidyl ether; benzyl glycidyl ether; 10,11-epoxyundecan-1-ol; 4,5-epoxypentyl butyrate; 5,6-epoxyhexanenitrile; N,N-dimethyl-10,11-undecylamide; 1,2-epoxy-5-hexene; 1,2-epoxy-7-octene; (2,3-epoxypropyl)benzene; styrene oxide; and 1,2,7,8-diepoxyoctane. The epoxide compound can be a disubstituted epoxides. The disubstituted epoxide can be cis-2,3-epoxybutane; trans-2,3-epoxybutane; trans-3,4-epoxyhexane; and trans-2,3-epoxyoctane. The epoxide compound can be an enantiomeric epoxides. The enantiomeric epoxides can be (R)-propylene oxide ((R)-6); (S)-1,2-epoxyhexane ((S)-10); and (R)-benzyl glycidyl ether ((R)-20).

The epoxide compound can include substituted epoxide compounds. The substituted epoxide compounds can be compounds containing ethers, alcohols, esters, amides, nitriles, silyl ethers, alkenes, aromatics. In some examples, the epoxide compound can be an epoxy silane For example, the epoxy silane can be 3-glycidoxypropyltrimethyoxysilane, 3-glycidoxypropyltriethoxysilane, 3-glycidoxypropylmethyldiethoxysilane, 3-glycidoxypropylmethyldimethoxysilane, 2-(3,4-epoxycyclohexyl)-ethyltriethoxysilane, 2-(3,4-epoxycyclohexyl)-ethyltriethoxysilane, [3-(2,3-Epoxypropoxy)propyl]triethoxysilane, [3-(2,3-Epoxypropoxy)propyl]trimethoxysilane, and [3-(2,3-Epoxypropoxy)propyl]Methylidiethoxysilane.

In at least one example, the epoxide compound can have the formula I:

The R group of the above epoxide compound and any other chemical variable appearing in the structures described herein encompass those chemical moieties and functional groups that would be recognized by one having skill in the art of organic chemistry as being compatible with the structure and function of the molecules bearing those chemical variables. Exemplary functional groups include substituted and unsubstituted cyclic and acyclic hydrocarbon moieties, substituted and unsubstituted cyclic and acyclic heteroatom-containing moieties, as well as functional groups comprising heteroatoms, halogens, and/or metalloid elements. To further define the range of suitable groups certain definitions are provided below. Nonetheless, it is to be understood that these definitions are meant to be representative and the absence of a specific group or moiety in the definitions below is not necessarily meant to exclude such groups or to imply that such a group is not encompassed by the present disclosure.

In any case where a chemical variable is shown attached to a bond that crosses a bond of ring (for example as shown for R above, this means that one or more such variables are optionally attached to the ring having the crossed bond. Each R group on such a ring can be attached at any suitable position, this is generally understood to mean that the group is attached in place of a hydrogen atom on the parent ring. This includes the possibility that two R groups can be attached to the same ring atom. Furthermore, when more than one R group is present on a ring, each may be the same or different than other R groups attached thereto, and each group is defined independently of other groups that may be attached elsewhere on the same molecule, even though they may be represented by the same identifier.

In at least one embodiment of the epoxides of formula I, each R group can be independently selected from the group consisting of: (a) $C_1$ to $C_{20}$ alkyl: (b) $C_2$ to $C_{20}$ alkenyl; (c) $C_2$ to $C_{20}$ alkynyl; (d) up to a $C_{12}$ carbocycle, (e) up to a $C_{12}$ heterocycle; (f) —$C(R^{13})_zH_{(3-z)}$; and (g) a polymer chain. Two or more R groups may be taken together with the carbon atoms to which they are attached to form one or more rings, and any of (a) through (e) may optionally be further substituted with one or more F groups.

F can be independently selected from the group consisting of: halogen; —$OR^{10}OC(O)R^{13}$; —$OC(O)OR^{13}$; —$OC(O)NR^{11}R^{12}$; —CN; —CNO; —$C(O)R^{13}$; —$C(O)OR^{13}$; —$C(O)NR^{11}R^{12}$, —$C(R^{13})_zH_{(3-z)}$; —$NR^{11}C(O)R^{10}$; —$NR^{11}C(O)OR^{10}$; —NCO; —$NR^{12}SO_2R^{13}$; —$S(O)_xR^{13}$; —$S(O)_2NR^{11}R^{12}$; —$NO_2$; —$N_3$; —$(CH_2)_kR^{14}$; —$(CH_2)_k$—Z—$R^{16}$; and —$(CH_2)_k$—Z—$(CH_2)_m$—$R^{14}$.

$R^{10}$ at each occurrence can be independently selected from the group consisting of: $C(R^{13})_zH_{(3-z)}$; $C_1$ to $C_{12}$ alkyl; $C_2$ to $C_{12}$ alkenyl; $C_2$ to $C_{12}$ alkynyl; up to a $C_{12}$ carbocycle; up to a $C_{12}$ heterocycle; —$S(O)_2R^{13}$; $Si(R^{15})_3$; H; and a hydroxyl protecting group.

$R^{11}$ and $R^{12}$ at each occurrence can be independently selected from the group consisting of: —H; $C_1$ to $C_{12}$ alkyl; $C_2$ to $C_{12}$ alkenyl; $C_2$ to $C_{12}$ alkynyl; and —$C(R^{13})_zH_{(3-z)}$. $R^{11}$ and $R^{12}$, when both present, can optionally be taken together with the atom to which they are attached to form a 3- to 10-membered ring. $R^{13}$ at each occurrence can be independently selected from the group consisting of: —H; $C_1$ to $C_{12}$ alkyl; $C_2$ to $C_{12}$ alkenyl; $C_2$ to $C_{12}$ alkynyl; up to a $C_{12}$ carbocycle; and up to a $C_{12}$ heterocycle.

$R^{14}$ at each occurrence can be independently selected from the group consisting of: halogen; —$OR^{10}$; —OC(O)$R^{13}$; —OC(O)$R^{13}$; —OC(O)$NR^{11}R^{12}$; —CN; —CNO; —$C(R^{13})_zH_{(3-z)}$; —C(O)$R^{13}$; —C(O)$OR^{13}$; —C(O)$NR^{11}R^{12}$; —$NR^{11}C(O)R^{13}$; —$NR^{11}C(O)OR^{10}$; —$NR^{11}SO_2R^{13}$; —NCO; —$N_3$; —$NO_2$; —$S(O)_xR^{13}$; —$SO_2NR^{11}R^{12}$; up to a $C_{12}$ heterocycle; and up to a $C_{12}$ carbocycle.

$R^{15}$ at each occurrence can be independently selected from the group consisting of: $C_1$ to $C_6$ alkyl; $C_2$ to $C_6$ alkenyl; $C_2$ to $C_6$ alkynyl; and up to $C_{12}$ substituted or unsubstituted carbocycle.

$R^{16}$ at each occurrence can be independently selected from the group consisting of: $C_1$ to $C_{12}$ alkyl; $C_2$ to $C_{12}$ alkenyl; $C_2$ to $C_{12}$ alkynyl; up to a $C_{12}$ heterocycle; up to a $C_{12}$ carbocycle; and —$C(R^{13})_zH_{(3-z)}$.

Z is a divalent linker and can be selected from the group consisting of: —(CH=CH)$_a$—; —(CH≡CH)$_a$—; —C(O)—; —C(=$NOR^{11}$)—; —C(=$NNR^{11}R^{12}$)—; —O—; —N($R^{11}$)—; —N(C(O)$R^{13}$)—; S(O)$_x$—; a polyether; and a polyamine.

In some examples herein, for the above groups, a can be 1, 2, 3, or 4; k can be an integer from 1 to 8 inclusive; m can be an integer from 1 to 8 inclusive; x can be 0, 1, or 2; and z can be 1, 2, or 3.

The polyurethane composites herein can include an inorganic filler, such as an inorganic particulate filler. Suitable examples of inorganic fillers can be an ash, ground/recycled glass (e.g., window or bottle glass); milled glass; glass spheres; glass flakes; calcium carbonate; aluminum trihydrate (ATH); silica; sand; ground sand; silica fume; slate dust; crusher fines; red mud; amorphous carbon (e.g., carbon black); clays (e.g., kaolin); mica; talc; wollastonite; alumina; feldspar; bentonite; quartz; garnet; saponite; beidellite; granite; slag; calcium oxide; calcium hydroxide; antimony trioxide; barium sulfate; magnesium oxide; titanium dioxide; zinc carbonate; zinc oxide; nepheline syenite; perlite; diatomite; pyrophillite; flue gas desulfurization (FGD) material; soda ash; trona; expanded clay; expanded shale; expanded perlite; vermiculite; volcanic tuff; pumice; hollow ceramic spheres; hollow plastic spheres; expanded plastic beads (e.g., polystyrene beads); ground tire rubber; and mixtures thereof.

The inorganic filler can have a median particle size diameter of from 0.2 micron to 100 microns. For example, the inorganic filler can have a median particle size diameter of 100 microns or less, 95 microns or less, 90 microns or less, 85 microns or less, 80 microns or less, 75 microns or less, 70 microns or less, 65 microns or less, 60 microns or less, 55 microns or less, 50 microns or less, 45 microns or less, 40 microns or less, 35 microns or less, 30 microns or less, 25 microns or less, or 20 microns or less. In some embodiments, the inorganic filler can have a median particle size diameter of 0.2 microns or more, 0.3 microns or more, 0.4 microns or more, 0.5 microns or more, 0.7 microns or more, 1 micron or more, 2 microns or more, 5 microns or more, 10 microns or more, 15 microns or more, 20 microns or more, 25 microns or more, 30 microns or more, 35 microns or more, 40 microns or more, or 45 microns or more. In some examples, the inorganic filler can have a median particle size diameter of from 0.2 microns to 100 microns, 0.2 microns to 90 microns, or 0.3 microns to 80 microns, 1 to 50 microns, 1 to 25 microns, or 5 to 15 microns.

In some embodiments, the inorganic filler includes an ash. The ash can be a coal ash or another type of ash such as those produced by firing fuels including industrial gases, petroleum coke, petroleum products, municipal solid waste, paper sludge, wood, sawdust, refuse derived fuels, switchgrass or other biomass material. The coal ash can be fly ash, bottom ash, or combinations thereof. In some examples, the inorganic filler includes fly ash. Fly ash is produced from the combustion of pulverized coal in electrical power generating plants. The fly ash useful with the composite materials described herein can be Class C fly ash, Class F fly ash, or a mixture thereof. Fly ash produced by coal-fueled power plants is suitable for incorporation in the composites described herein. In some embodiments, the inorganic filler consists of or consists essentially of fly ash.

The fly ash can have a particle size distribution with at least two modes. For example, the particle size distribution of the fly ash can be three, four, five, or more modes. Alternatively, the fly ash can be blended with another fly ash to modify the properties of the fly ash to produce a fly ash having a particle size distribution with at least three modes.

In some embodiments, the particle size distribution can include 11-35% of the particles by volume in the first mode, 65-89% of the particles by volume in the second mode. In some embodiments, the particle size distribution can include 11-17% of the particles by volume in the first mode, 56-74% of the particles by volume in the second mode, and 12-31% of the particles by volume in the third mode. The ratio of the volume of particles in the second mode to the volume of particles in the first mode can be from 4.5 to 7.5.

The inorganic filler can be present in the polyurethane composites described herein in amounts from 20% to 90% by weight, based on the total weight of the polyurethane composite. Examples of the amount of inorganic filler present in the polyurethane composite described herein include at least 20%, 25%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90% by weight based on the weight of the polyurethane composite. In some embodiments, the inorganic filler, for example fly ash, can be present in amounts from 35% to 80% by weight, such as from 50% to 80% by weight, or from 50% to 75% by weight. In some embodiments, the inorganic filler can include calcium carbonate and can be present from 20% to 70% by weight, such as from 45% to 65% by weight, based on the total weight of the polyurethane composite. In some embodiments, the calcium carbonate can be in the form of limestone.

In some embodiments, the inorganic filler can include a mixture of fly ash and calcium carbonate. When used with fly ash, the amount of calcium carbonate in the polyurethane composites can be 0.1% or greater, 0.5% or greater, 1% or greater, 2% or greater, 3% or greater, 5% or greater, 7% or greater, 10% or greater, 12% or greater, or 15% or greater by weight, based on the weight of the polyurethane composites. In some embodiments, the polyurethane composites can include 15% or less, 14% or less, 12% or less, 10% or less, 8% or less, 5% or less, or 3% or less by weight calcium carbonate. In some embodiments, when used with fly ash, the polyurethane composites can include 1% to 15%, 1% to 10%, or 1% to 8% by weight calcium carbonate.

The composites can include a plurality of inorganic fibers. The inorganic fibers can be any natural or synthetic fiber. Inorganic fibers suitable for use with the composites can include glass fibers, basalt fibers, alumina silica fibers, aluminum oxide fibers, silica fibers, carbon fibers, metal fibers, metal and metal-coated fibers, and mineral fibers (such as stone wool, slag wool, or ceramic fiber wool). In some embodiments, the inorganic fibers can include glass fibers. Glass fibers can include fibrous glass such as E-glass, C-glass, S-glass, and AR-glass fibers. In some examples, fire resistant or retardant glass fibers can be included to impart fire resistance or retarding properties to the polyurethane composites. In some embodiments, the composites can include a combination of fibers that break and fibers that do not break when the polyurethane composites is being formed using processing machinery and/or fractured by external stress.

In some embodiments, the glass fibers can be dispersed within the composite. The glass fibers in the polyurethane composites can be present in the form of individual fibers, chopped fibers, bundles, strings such as yarns, fabrics, papers, rovings, mats, or tows. In some embodiments, the composite can include a plurality of glass fibers having an average length of 1 mm or greater, 1.5 mm or greater, 2 mm or greater, 3 mm or greater, 4 mm or greater, 5 mm or greater, or 6 mm or greater. In some embodiments, the average length of the glass fibers can be 50 mm or less, 40 mm or less, 30 mm or less, 20 mm or less, 15 mm or less, 12 mm or less, or 10 mm or less. In some examples, the glass fibers can be from 1 mm to 50 mm in average length. For example, the glass fibers can be from 1.5 mm to 30 mm, from 2 mm to 30 mm, from 3 mm to 30 mm, or from 3 mm to 15 mm in average length. The glass fibers in the composite can have any dimension of from 1 µm to 30 µm in average diameter. For example, the average diameter of the glass fibers can be 1.5 µm to 30 µm, 3 µm to 20 µm, 4 µm to 18 µm, or 5 µm to 15 µm. The glass fibers can be provided in the composite in a random orientation or can be axially oriented.

The glass fibers can be present in the polyurethane composite in amounts of 15% or less by weight, based on the weight of composite. For example, the glass fibers can be present in amounts from 0.25% to 15%, 0.5% to 15%, 1% to 15%, 0.25% to 10%, 0.5% to 10%, 1% to 10%, 0.25% to 8%, 0.25% to 6%, or 0.25% to 4% by weight, based on the weight of the polyurethane composite.

The polyurethane composite can include additional fiber materials. The additional fiber materials can include polyalkylene fibers, polyamide fibers, polyester fibers, phenol-formaldehyde fibers, polyvinyl chloride fibers, polyacrylic fibers, acrylic polyester fibers, polyurethane fibers, polyacrylonitrile fibers, rayon fibers, cellulose fibers, carbon fibers, or combinations thereof. In certain embodiments, the additional fiber materials can include hemp fibers, sisal fibers, cotton fibers, straw, reeds, or other grasses, jute, bagasse fibers, bamboo fibers, abaca fibers, flax, southern pine fibers, wood fibers, cellulose, saw dust, wood shavings, lint, vicose, leather fibers, rayon, and mixtures thereof. Other suitable additional fiber materials include synthetic fibers such as, Kevlar, viscose fibers, Dralon® fibers, polyethylene fibers, polyethylene naphthalate fibers, polypropylene fibers, polyvinyl alcohol fibers, aramid fibers, or combinations thereof.

In some embodiments, the fibers and/or the inorganic filler such as fly ash can be coated with a material, e.g., a compound or composition, to modify their reactivity. For example, the fibers and/or the inorganic filler can be coated or otherwise combined with a sizing agent (also referred to herein as a compatibilizer). In some embodiments, the fibers and/or the inorganic filler can be coated with a composition for promoting adhesion. U.S. Pat. No. 5,064,876 to Hamada et al. and U.S. Pat. No. 5,082,738 to Swofford, for example, disclose compositions for promoting adhesion. U.S. Pat. No. 4,062,999 to Kondo et al., and U.S. Pat. No. 6,602,379 to Li et al. describe suitable aminosilane compounds for coating fibers. In some embodiments, the fibers and/or the inorganic filler are surface coated with a composition comprising a silane compound such as aminosilane. In some embodiments, the fibers and/or the inorganic filler are surface coated with a composition comprising an oil, starch, or a combination thereof.

Additional components useful with the polyurethane composites can include foaming agents, blowing agents, surfactants, chain-extenders, crosslinkers, UV stabilizers, fire retardants, antimicrobials, anti-oxidants, and pigments. Though the use of such components is well known to those of skill in the art, some of these additional additives are further described herein.

Exemplary chemical foaming agents include, but are not limited to, azodicarbonamides (e.g., Celogen manufactured by Lion Copolymer Geismar); and other materials that react at the reaction temperature to form gases such as carbon dioxide. In the case of polyurethane foam, water is an exemplary foaming agent that reacts with isocyanate to yield carbon dioxide. The presence of water as an added component or in the filler also can result in the formation of polyurea bonds through the reaction of the water and isocyanate. In some embodiments, water may be present in the mixture used to produce the polyurethane composites in an amount of from greater than 0% to 5% by weight or less, based on the weight of the mixture. In some embodiments, water can be present in a range of 0.02% to 4%, 0.05% to 3%, 0.1% to 2%, or 0.2% to 1% by weight, based on the weight of the mixture. In some embodiments, the mixture used to produce the composite includes less than 0.5% by weight water. In some embodiments, no chemical foaming agents are used (e.g., the polyurethane composite is prepared in the absence of water or azodicarbonamides). In some embodiments, water is the only foaming agent used.

Surfactants can be used as wetting agents and to assist in mixing and dispersing the materials in a composite. Surfactants can also stabilize and control the size of bubbles formed during the foaming event and the resultant cell structure. Surfactants can be used, for example, in amounts below about 0.5 wt % based on the total weight of the mixture. Examples of surfactants useful with the polyurethanes described herein include anionic, non-ionic and cationic surfactants.

Low molecular weight reactants such as chain-extenders and/or crosslinkers can be included in the polyurethane composites described herein. These reactants may help the polyurethane composites to distribute and contain the fiber material and/or inorganic filler within the composite. Chain-extenders are difunctional molecules, such as diols or diamines, that can polymerize to lengthen the urethane polymer chains. Examples of chain-extenders include ethylene glycol; 1,4-butanediol; ethylene diamine, 4,4'-methylenebis(2-chloroaniline) (MBOCA); diethyltoluene diamine (DETDA); and aromatic diamines such as Unilink 4200 (commercially available from UOP). Crosslinkers are tri- or greater functional molecules that can integrate into a polymer chain through two functionalities and provide one or more further functionalities (i.e., linkage sites) to crosslink to additional polymer chains. Examples of crosslinkers include glycerin, trimethylolpropane, sorbitol, diethanolamine, and triethanolamine. In some polyurethane composites, a crosslinker or chain-extender may be used to replace at least a portion of the one or more polyols in the polyurethane composites. For example, the polyurethane can be formed by the reaction of an isocyanate, a polyol, and a crosslinker.

Compatibilizers and other surface treatments such as viscosity reducers, flow control agents, or dispersing agents can be added directly to the filler or fiber, or incorporated prior to, during, and/or after the mixing and reaction of the polyurethane composites. Compatibilizers may also reduce the viscosity of the polyurethane composites mixture. Compatibilizers can also allow higher filler loadings of the inorganic filler such as fly ash, and/or fiber material, and may be used in small quantities. For example, the polyurethane composites may comprise about 0.01 wt % to about 0.5 wt % of a compatibilizer.

Ultraviolet light stabilizers, such as UV absorbers, can be added to the polyurethane composites described herein. Examples of UV light stabilizers include hindered amine type stabilizers and opaque pigments like carbon black powder. Fire retardants can be included to increase the flame or fire resistance of the polyurethane composites. In some examples herein, however, the polyurethane composite is devoid of a fire retardant. Antimicrobials can be used to limit the growth of mildew and other organisms on the surface of the composite. Antioxidants, such as phenolic antioxidants, can also be added. Antioxidants provide increased UV protection, as well as thermal oxidation protection.

Pigments or dyes can optionally be added to the polyurethane composites described herein. An example of a pigment is iron oxide, which can be added in amounts ranging from about 2 wt % to about 7 wt %, based on the total weight of the polyurethane composites. Any other suitable pigments or dyes may be used.

A reinforcement can be included on one or more surfaces of the polyurethane composites described herein. Fiber reinforcements are described in PCT/US2016/027863 (published as WO 2017/180154), the disclosure of which is herein incorporated by reference in its entirety. In some embodiments, the polyurethane composite can include a first fiber reinforcement on a first surface of the composite. In some embodiments, the composite can include a first fiber reinforcement on a first surface of the polyurethane composite and a second fiber reinforcement on a second surface, opposite the first surface, of the polyurethane composite. The fiber reinforcement can include any of the fiber materials as described herein and can include a blend of different fibers (either type or size). In some embodiments, the fiber reinforcement can include glass fibers. The fiber reinforcement can be woven or non-woven. In some embodiments, the polyurethane composite can include a first fiber reinforcement on a first surface of the composite and a material, other than a fiber reinforcement, on a second surface of the composite. In some embodiments, the material can include a cementitious layer, a paper sheet, a metal sheet, a polymeric layer, or a combination thereof. Examples of such materials include an aluminum sheet, an aluminum-plated sheet, a zinc sheet, a zinc-plated sheet, an aluminum/zinc alloy sheet, an aluminum/zinc alloy-plated sheet, a stainless steel sheet, craft paper, a polymeric surfacing film, or a combination thereof.

Methods of preparing the polyurethane composites described herein are also disclosed. The composites can be produced using a batch, semi-batch, or continuous process. In some embodiments, the method can include forming a polyurethane mixture. The polyurethane mixture can be produced by mixing one or more isocyanates and a polyol or polyol mixture, such as a polyester polyol and a Mannich polyol. The polyurethane mixture can be produced by mixing the one or more isocyanates, a polyester polyol, a Mannich polyol, and inorganic filler. The materials can be added in any suitable order.

In other examples, the polyurethane mixture can be produced by mixing the one or more isocyanates, polyol(s), and a coupling agent, e.g., an epoxy compound and/or a silane compound. For example, the polyurethane mixture can be produced by mixing the one or more isocyanates, a polyol, a silane compound, and inorganic filler. The components can be added in any suitable order. For example, in some embodiments, the mixing stage of the method used to prepare the polyurethane composite can include: (1) mixing the polyol and inorganic filler; (2) mixing the isocyanate and silane compound with the polyol(s) and inorganic filler; and optionally (3) mixing a catalyst with the isocyanate, polyol, silane compound, and inorganic filler. The optional fibers can be added at the same time as the inorganic filler, or can be added prior to, during, or after stage (2) or (3). In other embodiments, the mixing stage of the method used to prepare the polyurethane composite can include: (1) mixing the isocyanate with the polyol(s) and silane compound, and optionally (2) mixing the catalyst with the isocyanate, the polyester polyol, and the Mannich polyol. In certain embodiments, the mixing stage of the method used to prepare the polyurethane composite can include simultaneously mixing the silane compound, isocyanate; polyol; optional inorganic filler, and optional catalyst.

The polyurethane mixture can contain from 10% to 90%, 10% to 80%, 10% to 70%, 10% to 60%, 20% to 90%, 20% to 80%, 20% to 70%, 20% to 60%, 30% to 90%, 30% to 80%, 30% to 70%, 30% to 60%, 40% to 90%, 40% to 80%, 40% to 70%, 40% to 60%, 50% to 90%, 50% to 80%, 50% to 70%, 50% to 60%, 55% to 90%, 55% to 80%, 55% to 70%, 55% to 60%, 60% to 90%, 60% to 80%, 60% to 70%, 65% to 90%, or 65% to 80% by weight of the polyester polyol based on the total amount of all polyols present in the mixture. The polyurethane mixture can contain from 10% to 90%, 10% to 80%, 10% to 70%, 10% to 60%, 10% to 50%, 10% to 45%. 10% to 40%, 10% to 35%, 20% to 90%, 20% to 80%, 20% to 70%, 20% to 60%, 20% to 50%, 20% to 45%. 20% to 40%, 20% to 35%, 30% to 90%, 30% to 80%, 30% to 70%, 30% to 60%, 30% to 50%, 30% to 45%. 30% to 40%, 40% to 90%, 40% to 80%, 40% to 70%, 40% to 60%, 50% to 90%, 50% to 80%, 50% to 70%, 50% to 60%, 55% to 90%, 55% to 80%, 55% to 70%, 55% to 60%, 60% to 90%, 60% to 80%, 60% to 70%, 65% to 90%, or 65% to 80% by weight of the Mannich polyol based on the total amount of all polyols present in the mixture. For example, in some embodiments, the mixing stage of the method used to prepare the polyurethane composite can include: (1) mixing the polyester polyol, the Mannich polyol and inorganic filler; (2) mixing the isocyanate with the polyester polyol, a Mannich polyol, and inorganic filler; and optionally (3) mixing the catalyst with the isocyanate, polyol, and inorganic filler. The optional fibers can be added at the same time as the inorganic filler, or can be added prior to, during, or after stage (2) or (3). In other embodiments, the mixing stage of the method used to prepare the polyurethane composite can include: (1) mixing the isocyanate with the polyester polyol, the Mannich polyol and optionally (2) mixing the catalyst with the isocyanate, the polyester polyol, and the Mannich polyol. In certain embodiments, the mixing stage of the method used to prepare the polyurethane composite can include simultaneously mixing the isocyanate; the polyester polyol, the Mannich polyol; optional inorganic filler, and optional catalyst.

The polyurethane mixture can have a viscosity below a particular threshold at the desired loadings so it can be more effectively processed. In some embodiments, a workable viscosity (initial viscosity) can be from 25000 cP to 400,000 cP, 30,000 cP to 400,000 cP, 65,000 cP to 400,000 cP, or 80,000 cP to 400,000 cP. The viscosity of the composite mixture can be measured using a Brookfield Viscometer.

The polyurethane composite mixture can be blended in any suitable manner to obtain a homogeneous or heterogeneous blend of the one or more isocyanate, the polyol(s) (e.g., polyester polyol and Mannich polyol), and the optional the inorganic filler, fiber material and catalyst. In some embodiments, mixing can be conducted in a high speed mixer or an extruder. An ultrasonic device can be used for enhanced mixing and/or wetting of the various components of the composite. The ultrasonic device produces an ultrasound of a certain frequency that can be varied during the mixing and/or extrusion process. The ultrasonic device useful in the preparation of composite panels described herein can be attached to or adjacent to the extruder and/or mixer. For example, the ultrasonic device can be attached to a die or nozzle or to the port of the extruder or mixer. An ultrasonic device may provide de-aeration of undesired gas bubbles and better mixing for the other components, such as blowing agents, surfactants, and catalysts.

The method of making the polyurethane composites can include allowing the one or more isocyanates, the polyol(s) (e.g., polyester polyol and Mannich polyol) to react in the presence of the inorganic filler to form a polyurethane composite. The composite has a first surface and a second surface opposite the first surface. The curing stage of the method used to prepare the polyurethane composite can be carried out in a mold cavity of a mold, the mold cavity formed by at least an interior mold surface. The mold can be a continuous forming system such as a belt molding system or can include individual batch molds. The belt molding system can include a mold cavity formed at least in part by opposing surfaces of two opposed belts. In some embodiments, a molded article can then be formed prior to the additional method steps in forming the composites.

In some embodiments, the polyurethane mixture can be foamed. The polyester polyol, the Mannich polyol, and the isocyanate can be allowed to produce a foamed composite material after mixing the components according to the methods described herein. In some embodiments, polyurethane foams can be formed by allowing the mixture to expand via a gas phase to form the foam. The gas phase can be generated in situ from reaction of water with the one or more isocyanates. The gas can be introduced into the polyurethane mixture. In some embodiments, the gas can be captured after gelation (i.e., formation) of the foam. The polyurethane composite can be formed while they are actively foaming or after they have foamed. For example, the polyurethane composite can be placed under the pressure of a mold cavity prior to or during the foaming of the polyurethane composite. In some cases, the mixture can be allowed to rise freely during foaming in the mold.

The composites herein may have improved dimensional stability that allows their use in exterior building materials and other structural applications subject to typical fluctuations in the temperature and humidity of the surrounding outdoor environment. The polyurethane composites can be formed into shaped articles. Further, the polyurethane composites can be building materials. Suitable building materials include, for example, siding materials, cladding, trim, beadboard, building panels, sheets, architectural moldings, sound barriers, thermal barriers, insulation, wall boards, ceiling tiles, ceiling boards, soffits, roofing materials, roof tile shingles, roof cover boards, slate panels, shake panels, cast molded products, moldings, sills, stone, masonry, brick products, posts, signs, guard rails, retaining walls, park benches, tables, slats, corner arches, columns, ceiling tiles, railroad ties, or other shaped articles.

Embodiments of the present disclosure further relate to any one or more of the following paragraphs.

A composite material comprising a polyurethane foam (optionally prepared with a coupling agent) and a plurality of inorganic particles dispersed in the polyurethane foam, wherein a sample of the polyurethane foam having a length of 48 inches has a moisture movement of less than 0.15% along the length, and/or a sample having a length of 6 inches has a moisture movement of less than 0.8% along the length, when submerged in 45° C. distilled water for 14 days.

A composite material comprising a polyurethane foam (optionally prepared with a coupling agent) and a plurality of inorganic particles dispersed in the polyurethane foam, wherein a sample of the polyurethane foam having a length of 48 inches has a moisture movement of less than 0.10% along the length, and/or a sample having a length of 6 inches has a moisture movement of less than 0.7% along the length, when submerged in 45° C. distilled water for 14 days.

A composite material comprising a polyurethane foam (optionally prepared with a coupling agent) and a plurality of inorganic particles dispersed in the polyurethane foam, wherein a sample of the polyurethane foam having a length of 48 inches has a moisture movement of less than 0.07% along the length, and/or a sample having a length of 6 inches has a moisture movement of less than 0.6% along the length, when submerged in 45° C. distilled water for 14 days.

A composite material comprising a polyurethane foam (optionally prepared with a coupling agent) and a plurality of inorganic particles dispersed in the polyurethane foam, wherein a sample of the polyurethane foam having a length of 48 inches has a moisture movement of less than 0.05% along the length, and/or a sample having a length of 6 inches has a moisture movement of less than 0.55% along the length, when submerged in 45° C. distilled water for 14 days.

A composite material comprising a polyurethane(optionally prepared with a coupling agent), wherein a sample of the polyurethane having a length of 48 inches has a moisture movement of less than 0.15% along the length, and/or a sample having a length of 6 inches has a moisture movement of less than 0.8% along the length, when submerged in 45° C. distilled water for 14 days.

A composite material comprising a polyurethane (optionally prepared with a coupling agent), wherein a sample of the polyurethane having a length of 48 inches has a moisture movement of less than 0.10% along the length, and/or a sample having a length of 6 inches has a moisture movement of less than 0.7% along the length, when submerged in 45° C. distilled water for 14 days.

A composite material comprising a polyurethane (optionally prepared with a coupling agent), wherein a sample of the polyurethane having a length of 48 inches has a moisture movement of less than 0.07% along the length, and/or a sample having a length of 6 inches has a moisture movement of less than 0.6% along the length, when submerged in 45° C. distilled water for 14 days.

A composite material comprising a polyurethane (optionally prepared with a coupling agent), wherein a sample of the polyurethane having a length of 48 inches has a moisture movement of less than 0.05% along the length, and/or a sample having a length of 6 inches has a moisture movement of less than 0.55% along the length, when submerged in 45° C. distilled water for 14 days.

A composite material comprising a polyurethane (optionally prepared with a coupling agent) wherein the polyurethane is formed from a reaction mixture comprising, a polyester polyol having an aromaticity of 30% to 60%, a Mannich polyol having an aromaticity of 5% to 40%, and at least one isocyanate selected from the group consisting of diisocyanates, polyisocyanates and mixtures thereof.

A composite material comprising a polyurethane wherein the polyurethane is formed from a reaction mixture comprising, 10 to 90 weight % of an aromatic dicarboxylic anhydride derived or aromatic dicarboxylic acid derived polyester polyol based on a total weight of all polyols in the reaction mixture, 10 to 90 weight % a Mannich polyol having an aromaticity of 5% to 40% based on a total weight of all polyols in the reaction mixture, optionally a coupling agent, and at least one isocyanate selected from the group consisting of diisocyanates, polyisocyanates and mixtures thereof.

A composite material comprising a polyurethane foam wherein the polyurethane foam is formed from a reaction mixture comprising, a polyester polyol having an aromaticity of 30% to 60%, a Mannich polyol having an aromaticity of 5% to 40%, optionally a coupling agent, at least one isocyanate selected from the group consisting of diisocyanates, polyisocyanates and mixtures thereof, and a plurality of inorganic particles.

A composite material comprising a polyurethane foam wherein the polyurethane foam is formed from a reaction mixture comprising, 10 to 90 weight % of an aromatic dicarboxylic anhydride derived or aromatic dicarboxylic acid derived polyester polyol based on a total weight of all polyols in the reaction mixture, 10 to 90 weight % a Mannich polyol having an aromaticity of 5% to 40% based on a total weight of all polyols in the reaction mixture, optionally a coupling agent, at least one isocyanate selected from the group consisting of diisocyanates, polyisocyanates and mixtures thereof, and a plurality of inorganic particles.

The composite material of any of the preceding paragraphs, wherein the polyurethane foam has a crosslink density from 0.1 to 1 mol/g.

The composite material of any of the preceding paragraphs, wherein the polyurethane has a crosslink density from 0.1 to 1 mol/g.

The composite material of any of the preceding paragraphs, wherein a sample of the polyurethane foam having a length of 48 inches, and/or a sample having a length of 6 inches, has a water uptake of at least than 5% when submerged in 45° C. distilled water for 14 days.

The composite material of any of the preceding paragraphs, wherein a sample of the polyurethane foam having a length of 48 inches, and/or a sample having a length of 6 inches, has a water uptake of less than 8% when submerged in 45° C. distilled water for 14 days.

The composite material of any of the preceding paragraphs, wherein a sample of the polyurethane having a length of 48 inches, and/or a sample having a length of 6 inches, has a water uptake of at least than 5% when submerged in 45° C. distilled water for 14 days.

The composite material of any of the preceding paragraphs, wherein a sample of the polyurethane having a length of 48 inches, and/or a sample having a length of 6 inches, has a water uptake of less than 8% when submerged in 45° C. distilled water for 14 days.

The composite material of any of the preceding paragraphs, wherein a sample of the polyurethane foam having a length of 48 inches has a moisture movement of less than 0.15% along the length, and/or a sample having a length of 6 inches has a moisture movement of less than 0.6% along the length, when submerged in 45° C. distilled water for 14 days.

The composite material of any of the preceding paragraphs, wherein a sample of the polyurethane foam having a length of 48 inches has a moisture movement of less than 0.10% along the length, and/or a sample having a length of 6 inches has a moisture movement of less than 0.7% along the length, when submerged in 45° C. distilled water for 14 days.

The composite material of any of the preceding paragraphs, wherein a sample of the polyurethane foam having a length of 48 inches has a moisture movement of less than 0.07% along the length, and/or a sample having a length of 6 inches has a moisture movement of less than 0.6% along the length, when submerged in 45° C. distilled water for 14 days.

The composite material of any of the preceding paragraphs, wherein a sample of the polyurethane foam having a length of 48 inches has a moisture movement of less than 0.05% along the length, and/or a sample having a length of 6 inches has a moisture movement of less than 0.55% along the length, when submerged in 45° C. distilled water for 14 days.

The composite material of any of the preceding paragraphs, wherein a sample of the polyurethane foam having a length of 48 inches has a moisture movement of less than 0.03% along the length, and/or a sample having a length of 6 inches has a moisture movement of less than 0.5% along the length, when submerged in 45° C. distilled water for 14 days.

The composite material of any of the preceding paragraphs, wherein a sample of the polyurethane having a length of 48 inches has a moisture movement of less than 0.15% along the length, and/or a sample having a length of 6 inches has a moisture movement of less than 0.8% along the length, when submerged in 45° C. distilled water for 14 days.

The composite material of any of the preceding paragraphs, wherein a sample of the polyurethane having a length of 48 inches, and/or a sample having a length of 6 inches has a moisture movement of less than 0.7% along the length, has a moisture movement of less than 0.10% along the length when submerged in 45° C. distilled water for 14 days.

The composite material of any of the preceding paragraphs, wherein a sample of the polyurethane having a length of 48 inches has a moisture movement of less than 0.07% along the length, and/or a sample having a length of 6 inches has a moisture movement of less than 0.6% along the length, when submerged in 45° C. distilled water for 14 days.

The composite material of any of the preceding paragraphs, wherein a sample of the polyurethane having a length of 48 inches has a moisture movement of less than 0.05% along the length, and/or a sample having a length of 6 inches has a moisture movement of less than 0.55% along the length, when submerged in 45° C. distilled water for 14 days.

The composite material of any of the preceding paragraphs, wherein a sample of the polyurethane having a length of 48 inches has a moisture movement of less than 0.03% along the length, and/or a sample having a length of 6 inches has a moisture movement of less than 0.5% along the length, when submerged in 45° C. distilled water for 14 days.

The composite material of any of the preceding paragraphs, wherein the composite material is siding materials, cladding, trim, beadboard, building panels, sheets, architectural moldings, sound barriers, thermal barriers, insulation, wall boards, ceiling tiles, ceiling boards, soffits, roofing materials, roof tile shingles, roof cover boards, slate panels, shake panels, cast molded products, moldings, sills, stone, masonry, brick products, posts, signs, guard rails, retaining walls, park benches, tables, slats, corner arches, columns, ceiling tiles, or railroad ties.

The composite material of any of the preceding paragraphs, wherein the polyurethane foam has a density from 10 lb/ft$^3$ to 75 lb/ft$^3$.

The composite material of any of the preceding paragraphs, wherein the polyurethane has a density from 10 lb/ft$^3$ to 75 lb/ft$^3$.

The composite material of any of the preceding paragraphs, wherein the polyurethane comprises a plurality of inorganic particles dispersed therein.

The composite material of any of the preceding paragraphs, wherein the polyurethane foam comprises a plurality of inorganic particles dispersed therein.

The composite material of any of the preceding paragraphs, wherein the inorganic particles comprises a fly ash.

The composite material of any of the preceding paragraphs, wherein the polyester polyol is formed from a material selected from the group of phthalic anhydride, phthalic acid, isophthalic acid, terephthalic acid, methyl esters of phthalic, isophthalic, or terephthalic acid, dimethyl terephthalate, polyethylene terephthalate, trimellitic anhydride, pyromellitic dianhydride, maleic anhydride, or mixtures thereof.

The composite material of any of the preceding paragraphs, wherein the polyester polyol comprises;

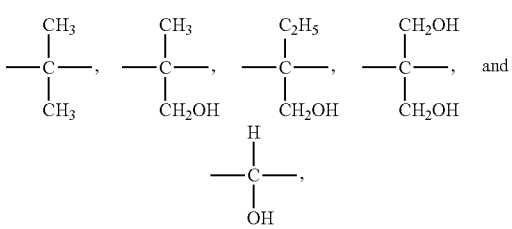

wherein R is a divalent radical selected from the group of: (a) alkylene radicals of about 2 to 10 carbon atoms; (b) radicals of the formula: —CH$_2$—R$_2$—CH$_2$— where R$_2$ is a radical selected from the group of:

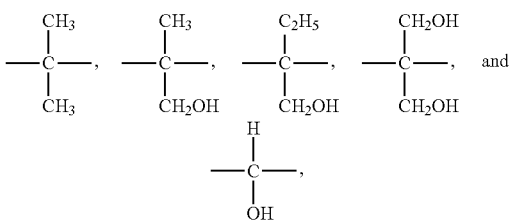

(c) radicals of the formula: —(R30)z—R3-where R3 is an alkylene radical containing from about 2 to about 4 carbon atoms, and z is an integer of from 1 to 200; and wherein n is an integer from 1 to 200. The intermediate polyester polyol can be the polyester polyol used in the present disclosure.

The composite material of any of the preceding paragraphs, wherein the polyester polyol comprises;

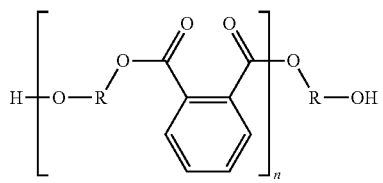

wherein R is a divalent radical selected from the group of: (a) alkylene radicals of about 2 to 10 carbon atoms; (b) radicals of the formula: —CH$_2$—R$_2$—CH$_2$— where R$_2$ is a radical selected from the group of:

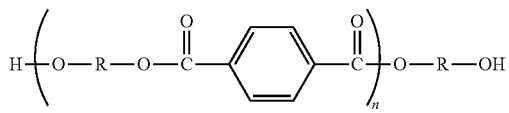

(c) radicals of the formula: —(R30)z—R3-where R3 is an alkylene radical containing from about 2 to about 4 carbon atoms, and z is an integer of from 1 to 200; and wherein n is an integer from 1 to 200. The intermediate polyester polyol can be the polyester polyol used in the present disclosure.

The composite material of any of the preceding paragraphs, wherein the coupling agent comprises a silane compound.

The composite material of any of the preceding paragraphs, wherein the coupling agent is a silane compound having the following structure:

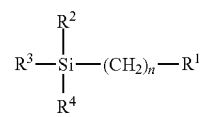

wherein R$^1$ is selected from the group isocyanate, amino, epoxy (oxirane rings), sulfur (thiols), acrylate, vinyl/olefin, anhydride, carboxylic acid, hydroxyl, dipodal, imide, alkoxy, and cyano, R$^2$ is selected from the group alkoxy, acyloxy, amine, chlorine, and aryl, R$^3$ is selected from the group alkoxy, acyloxy, amine, chlorine, and aryl, and R$^4$ is selected from the group alkoxy, acyloxy, amine, chlorine, and aryl.

The composite material of any of the preceding paragraphs, wherein the silane compound is

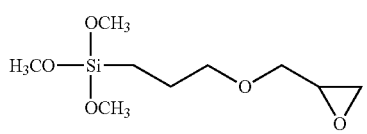

The composite material of any of the preceding paragraphs, wherein the silane compound is selected from the group of isocyanate functional silanes, amino functional silanes, epoxy functional silanes (oxirane rings), sulfur functional silanes (thiols), acrylatefunctional silanes, vinyl/ olefinfunctional silanes, anhydridefunctional silanes, carboxylic acid functional silanes, hydroxylfunctional silanes, dipodal functional silanes, masked silanes, imide functional silanes, alkoxy functional silanes, polymeric silanes and cyano functional silanes The composite material of any of the preceding paragraphs, wherein the silane compound is selected from the group of vinyltrichlorosilane, vinyltris (Bmethoxyethoxy) silane, vinyltriethoxysilane, vinyltrimethoxysilane, 3-metacryloxypropyl-trimethoxysilane, β-(3,4 epoxycyclohexyl)-ethyltrimethoxysilane, r-glycidoxypropyl-trimethoxysilane, r-glycidoxypropyl-methylidiethoxysilane, N-β (aminoethyl)-r-aminopropyl-trimethoxysilane, N-β (aminoethyl)-r-aminopropyl-methyldimethoxysilane, 3-aminopropyl-triethoxysilane, N-phenyl-r-aminopropyl-trimethoxysilane, r-mercaptopropyl-trimethoxysilane, r-chloropropyl-trimethoxysilane, 3-glycidyloxypropyltrimethoxysilane, 3-glycidoxypropyltriethoxysilane, N-(2-aminoethyl)-3-aminopropyltrimethoxysilane, 3-(triethoxysilyl)propylsuccinic anhydride, and N-trimethoxysilylmethyl-O-methyl-carbamate, vinyltriethoxysilane, gamma-methacryloxypropyltrimethoxysilane, vinyltri(2-methoxyethoxy) silane, vinyltrimethoxysilane, vinyltrichlorosilane, gamma(meth)acryloxypropyltri(2-methoxyethoxy)silane, gamma-acryloxypropyltriethoxysilane, vinyltriacetoxysilane, ethynyltriethoxysilane, and 2-propynyltrichlorosilane.

The composite material of any of the preceding paragraphs, wherein the silane compound is selected from the group of 3-glycidoxypropyltrimethyoxysilane, 3-glycidoxypropyltriethoxysilane, 3-glycidoxypropylmethyldiethoxysilane, 3-glycidoxypropylmethyldimethoxysilane, 2-(3,4-epoxycyclohexyl)-ethyltriethoxysilane, epoxycyclohexyl)-ethyltriethoxysilane, [3-(2,3-Epoxypropoxy)propyl]triethoxysilane, [3-(2,3-Epoxypropoxy)propyl]trimethoxysilane, and [3-(2,3--Epoxypropoxy)propyl]methyldiethoxysilane.

The composite material of any of the preceding paragraphs, wherein the polyurethane foam is modified with a silane compound having the following structure:

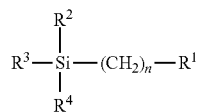

wherein $R^1$ is selected from the group isocyanate, amino, epoxy (oxirane rings), sulfur (thiols), acrylate, vinyl/olefin, anhydride, carboxylic acid, hydroxyl, dipodal, imide, alkoxy, and cyano, $R^2$ is selected from the group alkoxy, acyloxy, amine, chlorine, and aryl, $R^3$ is selected from the group alkoxy, acyloxy, amine, chlorine, and aryl, and $R^4$ is selected from the group alkoxy, acyloxy, amine, chlorine, and aryl.

The composite material of any of the preceding paragraphs, wherein the polyurethane foam is modified with a silane compound having the formula:

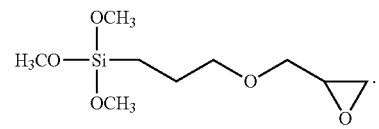

The composite material of any of the preceding paragraphs, wherein the polyurethane foam is modified with a silane compound selected from the group of 3-glycidoxypropyltrimethyoxysilane, 3-glycidoxypropyltriethoxysilane, 3-glycidoxypropylmethyldiethoxysilane, 3-glycidoxypropylmethyldimethoxysilane, epoxycyclohexyl)-ethyltriethoxysilane, 2-(3,4-epoxycyclohexyl)-ethyltriethoxysilane, [3-(2,3-Epoxypropoxy)propyl]triethoxysilane, [3-(2,3-Epoxypropoxy)propyl]trimethoxysilane, and [3-(2,3-Epoxypropoxy)propyl]methyldiethoxysilane.

A building material comprising the composite material of any of the preceding paragraphs.

The building material of any of the preceding paragraphs wherein the building material is selected from the group of siding materials, cladding, trim, beadboard, building panels, sheets, architectural moldings, sound barriers, thermal barriers, insulation, wall boards, ceiling tiles, ceiling boards, soffits, roofing materials, roof tile shingles, roof cover boards, slate panels, shake panels, cast molded products, moldings, sills, stone, masonry, brick products, posts, signs, guard rails, retaining walls, park benches, tables, slats, corner arches, columns, ceiling tiles, or railroad ties.

The building material of any of the preceding paragraphs, wherein a sample of the building material having a length of 48 inches has a moisture movement of less than 0.15% along the length, and/or a sample having a length of 6 inches has a moisture movement of less than 0.8% along the length, when submerged in 45° C. distilled water for 14 days.

The building material of any of the preceding paragraphs, wherein a sample of the building material having a length of 48 inches has a moisture movement of less than 0.10% along the length, and/or a sample having a length of 6 inches has a moisture movement of less than 0.7% along the length, when submerged in 45° C. distilled water for 14 days.

The building material of any of the preceding paragraphs, wherein a sample of the building material having a length of 48 inches has a moisture movement of less than 0.07% along the length, and/or a sample having a length of 6 inches has a moisture movement of less than 0.6% along the length, when submerged in 45° C. distilled water for 14 days.

The building material of any of the preceding paragraphs, wherein a sample of the building material having a length of 48 inches has a moisture movement of less than 0.05% along the length, and/or a sample having a length of 6 inches has a moisture movement of less than 0.55% along the length, when submerged in 45° C. distilled water for 14 days.

The building material of any of the preceding paragraphs, wherein a sample of the building material having a length of 48 inches has a moisture movement of less than 0.03% along the length, and/or a sample having a length of 6 inches has a moisture movement of less than 0.5% along the length, when submerged in 45° C. distilled water for 14 days.

A method of making a composite material comprising; (a) mixing at least one isocyanate selected from the group consisting of diisocyanates, polyisocyanates and mixtures thereof, a polyol, a coupling agent (e.g., a silane compound), and a plurality of inorganic particles to produce a mixture, (b) applying the mixture to a mold; and (c) allowing the mixture to react and expand to form the composite material.

A method of making a composite material comprising; (a) mixing at least one isocyanate selected from the group consisting of diisocyanates, polyisocyanates and mixtures thereof, a polyester polyol having an aromaticity of 30% to 60%, a Mannich polyol having an aromaticity of 5% to 40%, optionally a coupling agent, and a plurality of inorganic particles to produce a mixture, (b) applying the mixture to a mold; and (c) allowing the mixture to react and expand to form the composite material.

The method of making a composite material comprising; (a) mixing at least one isocyanate selected from the group consisting of diisocyanates, polyisocyanates and mixtures thereof, 10 to 90 weight % of an aromatic dicarboxylic anhydride derived or aromatic dicarboxylic acid derived polyester polyol based on a total weight of all polyols in the reaction mixture, 10 to 90 weight % a Mannich polyol having an aromaticity of 5% to 40% based on a total weight of all polyols in the reaction mixture, optionally a coupling agent, and a plurality of inorganic particles to produce a mixture, (b) applying the mixture to a mold; and (c) allowing the mixture to react and expand to form the composite material.

The method of any of the preceding paragraphs, wherein the coupling agent (e.g., silane compound) and the inorganic particles have been premixed prior to adding to the mixture.

The method of any of the preceding paragraphs, wherein the composite material is a polyurethane foam.

The method of any of the preceding paragraphs, wherein the polyurethane foam has a crosslink density from 0.1 to 1 mol/g.

The method of any of the preceding paragraphs, wherein a sample of the polyurethane foam having a length of 48 inches, and/or a sample having a length of 6 inches, has a water uptake of 1% to 10% or at least than 5% when submerged in 45° C. distilled water for 14 days.

The method of any of the preceding paragraphs, wherein a sample of the polyurethane foam having a length of 48 inches, and/or a sample having a length of 6 inches, has a water uptake of less than 8% when submerged in 45° C. distilled water for 14 days.

The method of any of the preceding paragraphs, wherein a sample of the polyurethane foam having a length of 48 inches has a moisture movement of less than 0.15% along the length, and/or a sample having a length of 6 inches has a moisture movement of less than 0.8% along the length, when submerged in 45° C. distilled water for 14 days.

The method of any of the preceding paragraphs, wherein a sample of the polyurethane foam having a length of 48 inches has a moisture movement of less than 0.10% along the length, and/or a sample having a length of 6 inches has a moisture movement of less than 0.7% along the length, when submerged in 45° C. distilled water for 14 days.

The method of any of the preceding paragraphs, wherein a sample of the polyurethane foam having a length of 48 inches has a moisture movement of less than 0.07% along the length, and/or a sample having a length of 6 inches has a moisture movement of less than 0.6% along the length, when submerged in 45° C. distilled water for 14 days.

The method of any of the preceding paragraphs, wherein a sample of the polyurethane foam having a length of 48 inches has a moisture movement of less than 0.05% along the length, and/or a sample having a length of 6 inches has a moisture movement of less than 0.55% along the length, when submerged in 45° C. distilled water for 14 days.

The method of any of the preceding paragraphs, wherein a sample of the polyurethane foam having a length of 48 inches has a moisture movement of less than 0.03% along the length, and/or a sample having a length of 6 inches has a moisture movement of less than 0.5% along the length, when submerged in 45° C. distilled water for 14 days.

The method of any of the preceding paragraphs, wherein the composite material is siding materials, cladding, trim, beadboard, building panels, sheets, architectural moldings, sound barriers, thermal barriers, insulation, wall boards, ceiling tiles, ceiling boards, soffits, roofing materials, roof tile shingles, roof cover boards, slate panels, shake panels, cast molded products, moldings, sills, stone, masonry, brick products, posts, signs, guard rails, retaining walls, park benches, tables, slats, corner arches, columns, ceiling tiles, or railroad ties.

The method of any of the preceding paragraphs, wherein the polyurethane foam has a density from 10 lb/ft$^3$ to 75 lb/ft$^3$.

The method of any of the preceding paragraphs, wherein the inorganic particles comprises a fly ash.

The method of any of the preceding paragraphs, wherein the polyester polyol is formed from a material selected from the group of phthalic anhydride, phthalic acid, isophthalic acid, terephthalic acid, methyl esters of phthalic, isophthalic, or terephthalic acid, dimethyl terephthalate, polyethylene terephthalate, trimellitic anhydride, pyromellitic dianhydride, maleic anhydride, or mixtures thereof.

The method of any of the preceding paragraphs, wherein the polyester polyol comprises;

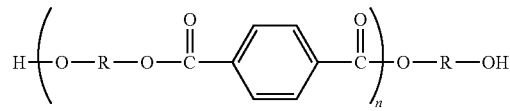

wherein R is a divalent radical selected from the group of: (a) alkylene radicals of about 2 to 10 carbon atoms; (b) radicals of the formula: —CH$_2$—R$_2$—CH$_2$— where R$_2$ is a radical selected from the group of:

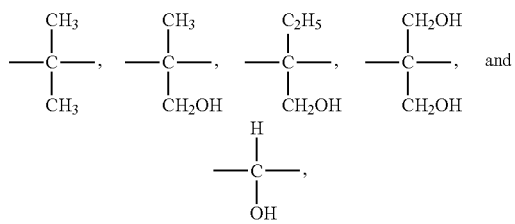

(c) radicals of the formula: —(R3O)z—R3— where R3 is an alkylene radical containing from about 2 to about 4 carbon atoms, and z is an integer of from 1 to 200; and wherein n is an integer from 1 to 200. The intermediate polyester polyol can be the polyester polyol used in the present disclosure.

The method of any of the preceding paragraphs, wherein the polyester polyol comprises;

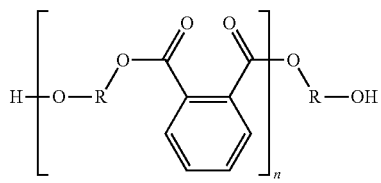

wherein R is a divalent radical selected from the group of: (a) alkylene radicals of about 2 to 10 carbon atoms; (b) radicals of the formula: —CH$_2$—R$_2$—CH$_2$— where R$_2$ is a radical selected from the group of:

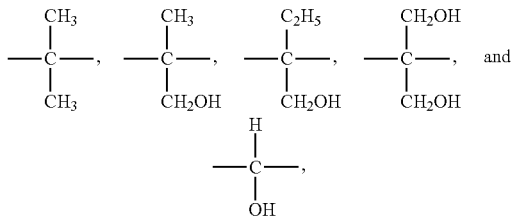

(c) radicals of the formula: —(R30)z—R3-where R3 is an alkylene radical containing from about 2 to about 4 carbon atoms, and z is an integer of from 1 to 200; and wherein n is an integer from 1 to 200. The intermediate polyester polyol can be the polyester polyol used in the present disclosure.

The method of any of the preceding paragraphs, wherein the coupling agent is or comprises a silane compound having the following structure:

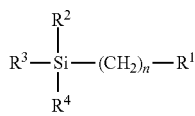

wherein R$^1$ is selected from the group isocyanate, amino, epoxy (oxirane rings), sulfur (thiols), acrylate, vinyl/olefin, anhydride, carboxylic acid, hydroxyl, dipodal, imide, alkoxy, and cyano, R$^2$ is selected from the group alkoxy, acyloxy, amine, chlorine, and aryl, R$^3$ is selected from the group alkoxy, acyloxy, amine, chlorine, and aryl, and R$^4$ is selected from the group alkoxy, acyloxy, amine, chlorine, and aryl.

The method of any of the preceding paragraphs, wherein the coupling agent is or a comprises a silane compound having the structure:

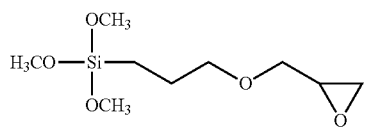

The method of any of the preceding paragraphs, wherein the silane compound is selected from the group of isocyanate functional silanes, amino functional silanes, epoxy functional silanes (oxirane rings), sulfur functional silanes (thiols), acrylatefunctional silanes, vinyl/olefinfunctional silanes, anhydridefunctional silanes, carboxylic acid functional silanes, hydroxylfunctional silanes, dipodal functional silanes, masked silanes, imide functional silanes, alkoxy functional silanes, polymeric silanes and cyano functional silanes.

The method of any of the preceding paragraphs, wherein the silane compound is selected from the group of vinyltrichlorosilane, vinyltris (Bmethoxyethoxy) silane, vinyltriethoxysilane, vinyltrimethoxysilane, 3-metacryloxypropyl-trimethoxysilane, β—(3,4 epoxycyclohexyl)-ethyltrimethoxysilane, r-glycidoxypropyl-trimethoxysilane, r-glycidoxypropyl-methylidiethoxysilane, N-β (aminoethyl)-r-aminopropyl-trimethoxysilane, N-β (aminoethyl)-r-aminopropyl-methyldimethoxysilane, 3-aminopropyl-triethoxysilane, N-phenyl-r-aminopropyl-trimethoxysilane, r-mercaptopropyl-trimethoxysilane, r-chloropropyl-trimethoxysilane, 3-glycidyloxypropyltrimethoxysilane, 3-glycidoxypropyltriethoxysilane, N-(2-aminoethyl)-3-aminopropyltrimethoxysilane, 3-(triethoxysilyl)propylsuccinic anhydride, and N-trimethoxysilylmethyl-O-methyl-carbamate, vinyltriethoxysilane, gamma-methacryloxypropyltrimethoxysilane, vinyltri(2-methoxyethoxy) silane, vinyltrimethoxysilane, vinyltrichlorosilane, gamma(meth)acryloxypropyltri(2-methoxyethoxy)silane, gamma-acryloxypropyltriethoxysilane, vinyltriacetoxysilane, ethynyltriethoxysilane, and 2-propynyltrichlorosilane.

The method of any of the preceding paragraphs, wherein the silane compound is selected from the group of 3-glycidoxypropyltrimethyoxysilane, 3-glycidoxypropyltriethoxysilane, 3-glycidoxypropylmethyldiethoxysilane, 3-glycidoxypropylmethyldimethoxysilane, 2—(3,4-epoxycyclohexyl)-ethyltriethoxysilane, epoxycyclohexyl)-ethyltriethoxysilane, [3—(2,3-Epoxypropoxy)propyl]triethoxysilane, [342,3-Epoxy propoxy)propyl]trimethoxysilane, and [3(2,3-Epoxypropoxy)propyl]methyldiethoxysilane.

Further disclosed herein is a composite material comprising a silane modified polyurethane foam; and a plurality of inorganic particles dispersed in the silane modified polyurethane foam; wherein a sample of the composite material having a length of 48 inches has a moisture movement of less than about 0.15% along the length, and/or a sample having a length of 6 inches has a moisture movement of less than 0.8% along the length. In some examples, the polyurethane foam may have a crosslink density of 0.1 mol/g to 1 mol/g. The composite material may have a fire resistance that meets the standards of at least Class B, including, e.g., Class A, according to ASTM E-84. The composite material may be devoid of a fire retardant. The silane modified polyurethane foam may comprise, for example, an epoxide silane compound, an aminosilane compound or a mercaptosilane compound. The sample of the composite material having a length of 48 inches, and/or the sample having a length of 6 inches, may have a water uptake of 1% to 10% when submerged in 45° C. distilled water for 14 days.

The present disclosure further includes a method of preparing a composite material, comprising: combining a polyol mixture, an isocyanate, a silane compound, and a plurality of inorganic particles to form a reaction mixture; and foaming the reaction mixture to produce the composite material; wherein a sample of the composite material having a length of 48 inches has a moisture movement of less than 0.15% along the length when submerged in 45° C. distilled water for 14 days, and/or a sample having a length of 6 inches has a moisture movement of less than 0.8% along the length. The silane compound may be present in an amount of 0.1% to 2.0% by weight, for example, based on the total weight of the polyol mixture. The polyol mixture may comprise a polyester polyol having an aromaticity of 5% to 60%, for example. The polyester polyol may be present in an amount of at least 50% by weight of the polyol mixture.

EXAMPLES

The following examples are intended to illustrate aspects of the present disclosure without being limiting in nature. It is understood that the present disclosure encompasses additional embodiments consistent with the foregoing description and following examples.

Example 1

Two polymer composites were prepared, with and without a coupling agent, for moisture movement analysis. The formulations of each composite (Formulations 1 and 2) are provided in Table 1. Both composites were prepared with a polyol mixture of polyether/polyester/Mannich polyols, isocyanate (methylene diphenyl diisocyanate (MDI)), surfactant, and fly ash as inorganic filler. The coupling agent used in Formulation 2 was an epoxide silane compound. Six cylinders were prepared (three cylinders for each composite) and used to cut nine rectangular specimens with dimensions of 6 in ×2 in ×1 in (length×width×depth) for each composite.

TABLE 1

| Formulation | Polyol | Coupling Agent | Isocyanate | Surfactant | Filler |
|---|---|---|---|---|---|
| 1 | 100 pphp | — | 111 pphp | 2 pphp | 73 % wt |
| 2 | 100 pphp | 0.8 % wt (based on polyol) | 111 pphp | 2 pphp | 73 % wt |

Moisture Movement

Three specimens from each cylinder formulation were immersed in 45° C. deionized (DI) water. Periodically, the specimens were removed from the water, patted dry with a towel, and the dimensions measured.

Water Absorption

Six specimens from each formulation were submerged into 60° C. DI water. At specified intervals the specimens were removed from the water, patted dry, and weighed to determine water absorption. After 5% and 10% absorption was achieved, three specimens of each formulation were dried in a 60° C. oven prior to measuring flexural strength.

Flexural Strength

Flexural strength and elastic modulus were determined on the cylinder specimens according to ASTM C1185 (2016). Testing was performed on as-received specimens as well as those subjected to the water absorption exposure described above.

The results of moisture absorption and dimension change including length, width, and thickness are shown in FIGS. 1-4. For mass absorption, Formulation 2 with coupling agent absorbed less water than the control, Formulation 1, without coupling agent. After 7 days immersion, Formulation 2 exhibited 33% less absorption. Furthermore, the dimension change including length, width, and thickness of Formulation 2 were significantly reduced compared to that of the controls. The dimension change reduction after 7 days was 36%, 55% and 35% for length, width and thickness, respectively, for Formulation 2.

Figure 5:
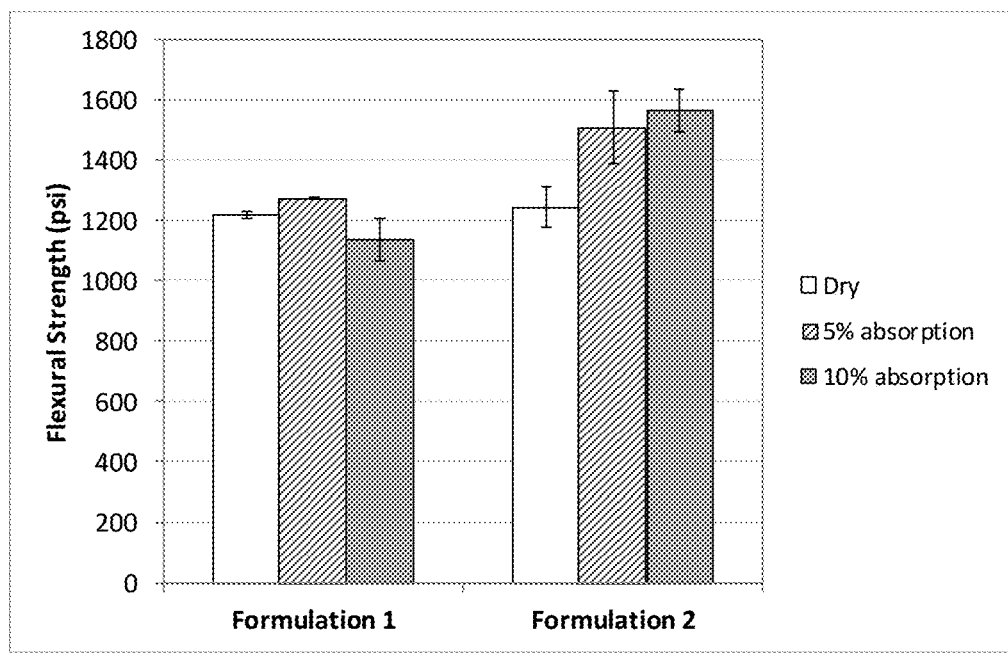
FIG. 5 shows results of flexural length testing of various polyurethane composite samples, as discussed in Example 1.
Figure 6:
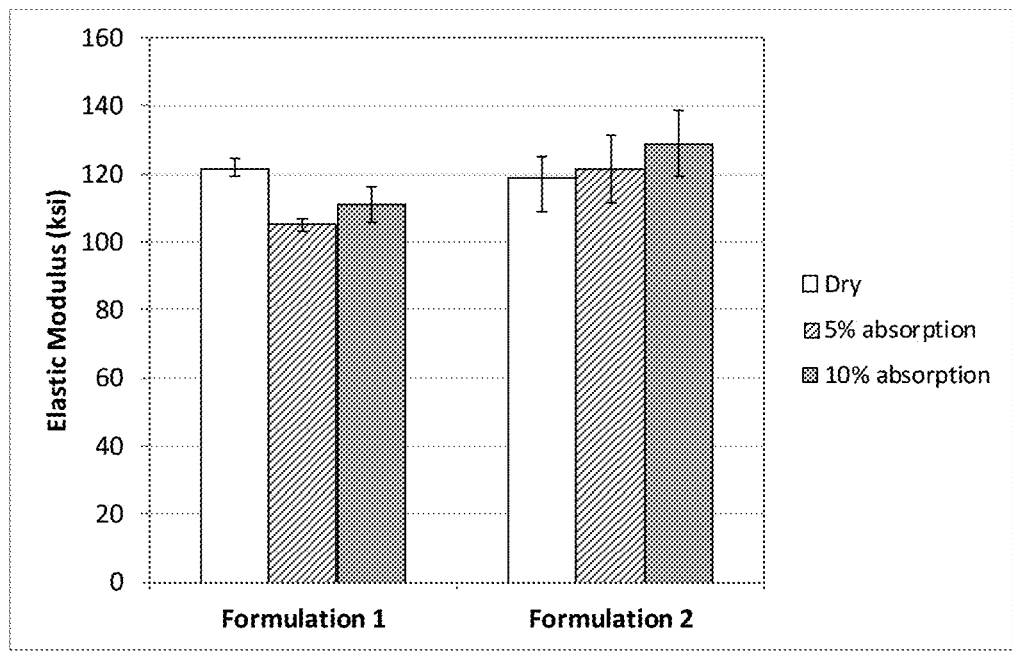
FIG. 6 shows results of elastic modulus testing of various polyurethane composite samples, as discussed in Example 1.

For the control, flexural strength increased slightly after 5% water absorption (followed by drying), possibly due to a temperature effect, and decreased at 10% water absorption. However, for Formulation 2 specimens, flexural strength increased substantially after 5 and 10% water absorption (FIG. 5). Similar trends were observed for elastic modulus (FIG. 6).

Without intending to be bound by theory, it is believed that a chemical reaction occurred between the epoxide group in the coupling agent with water, —NH2, and —OH groups when the specimens were exposed to water. The coupling agent close to the surface of the samples would have the chance to react with water first in the basic (high pH) medium. The epoxide ring may open to form —OH groups, which then may react with free isocyanate in the system to form a higher crosslinking density network on the surface. This potentially has the effect of decreasing water absorption and lowering the diffusion rate. It is believed that this also may increase flexural strength and elastic modulus after water immersion.

Example 2

Four polymer composites (Formulations 3-6) were prepared with polyol mixtures, with and without coupling agents, for moisture movement analysis. See Table 2. The polyol mixture of Formulation 3 had an aromaticity of about 10%, and the polyol mixtures of Formulations 4, 5, and 6 each had an aromaticity of about 40-50%. The composites were prepared with a polyol mixture (100 pphp), isocyanate (MDI, 102 pphp), surfactant (2 pphp), fly ash (73 wt %), and if applicable, a coupling agent (0.8 pphp). Thirty-two 4 ft×12 in ×1 in (length×width×depth) specimens were prepared (8 specimens for each formulation).

TABLE 2

| Formulation | Polyols | Coupling agent |
|---|---|---|
| 3 | polyether/polyester/Mannich | — |
| 4 | polyester/Mannich | — |
| 5 | polyester/Mannich | — |
| 6 | polyester/Mannich | epoxide silane |

Moisture movement, length change, flexural strength, and elastic modulus were measured as described in Example 1.

Figure 7:
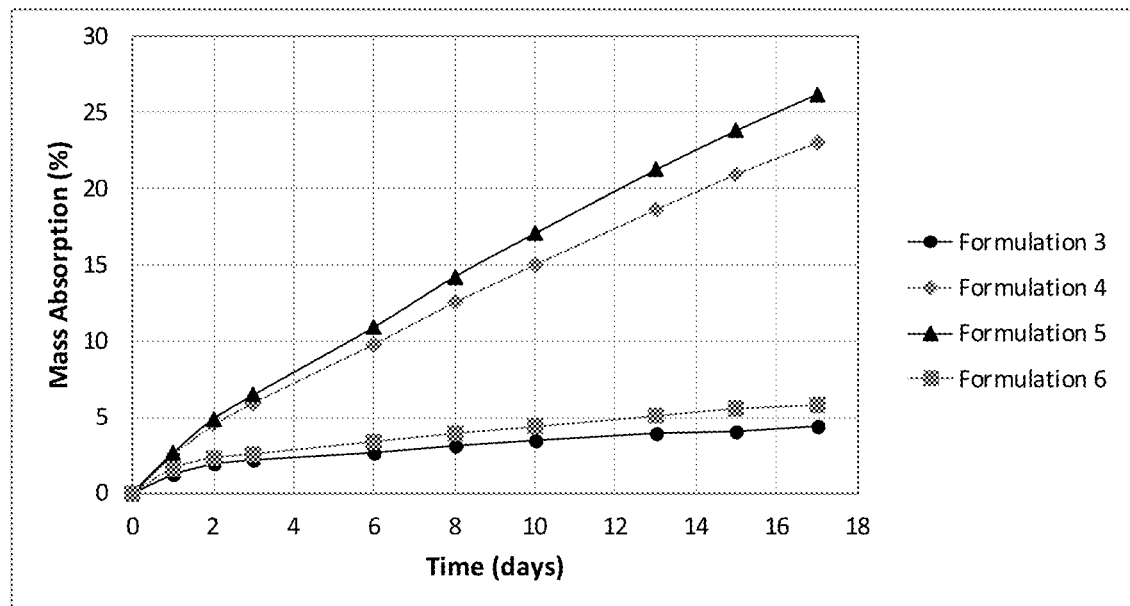
FIGS. 7-10 show results of moisture movement, length change, flexural strength, and elastic modulus testing of various polyurethane composite samples, as discussed in Example 2.
Figure 8:
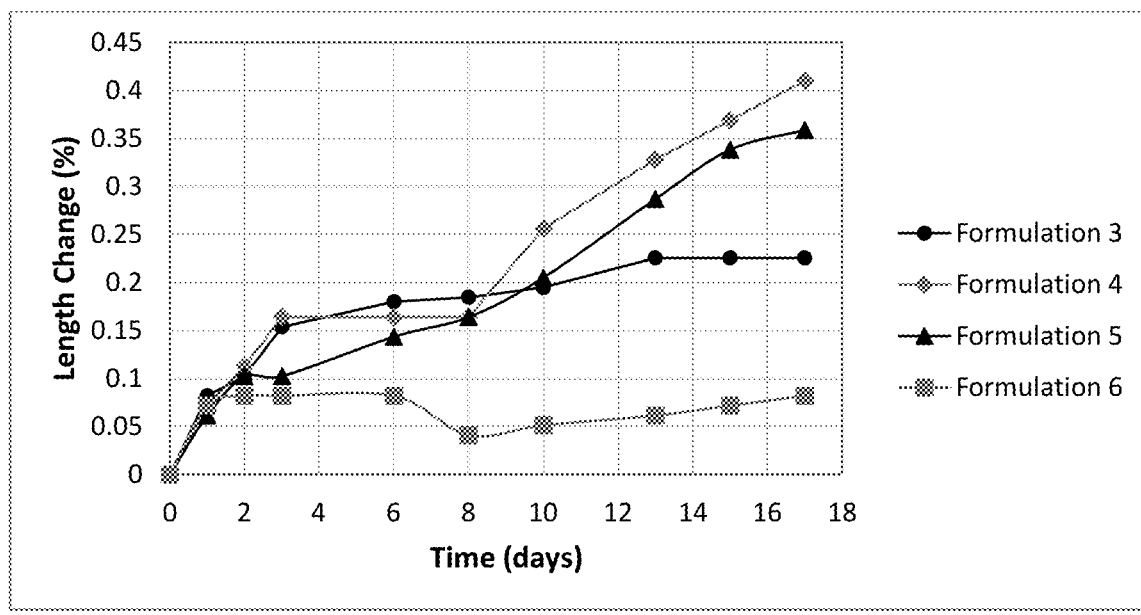

Four 4 ft×12 inch×1 inch boards of each formulation were immersed in water at 45° C. in an environmental chamber. Moisture absorption and dimension change including length, width, and thickness, were measured. Formulation 6 with coupling agent exhibited lower moisture absorption (comparable to Formulation 3; see FIG. 7) and the least dimensional change during water exposure (see FIG. 8). Formulations 4 and 5, prepared with polyol mixtures similar to Formulation 6 but without coupling agent, exhibited significantly higher water absorption.

Figure 9:
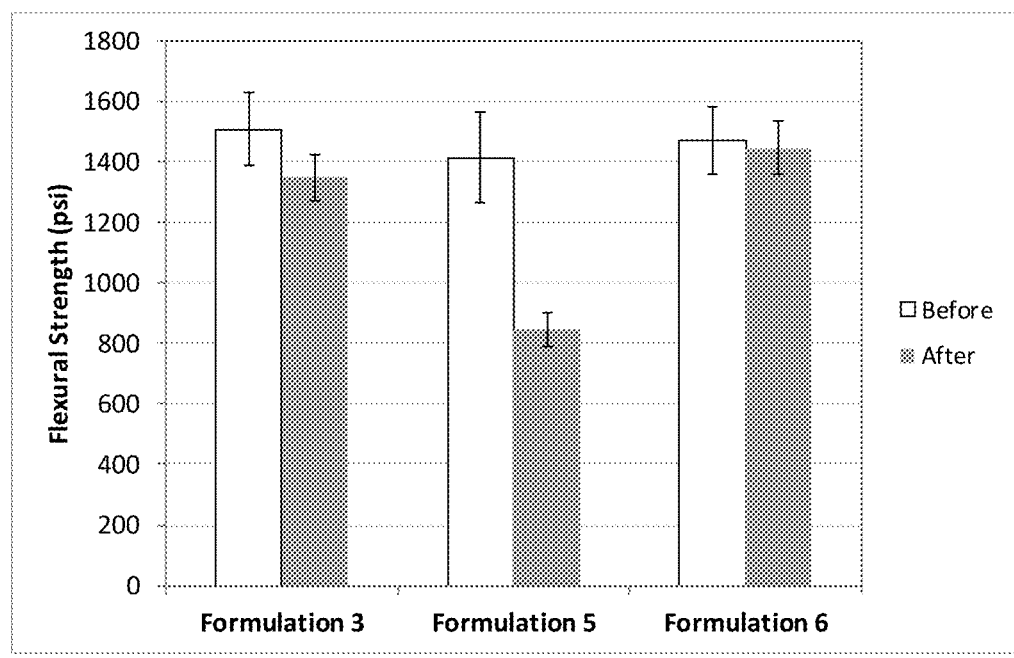
Figure 10:
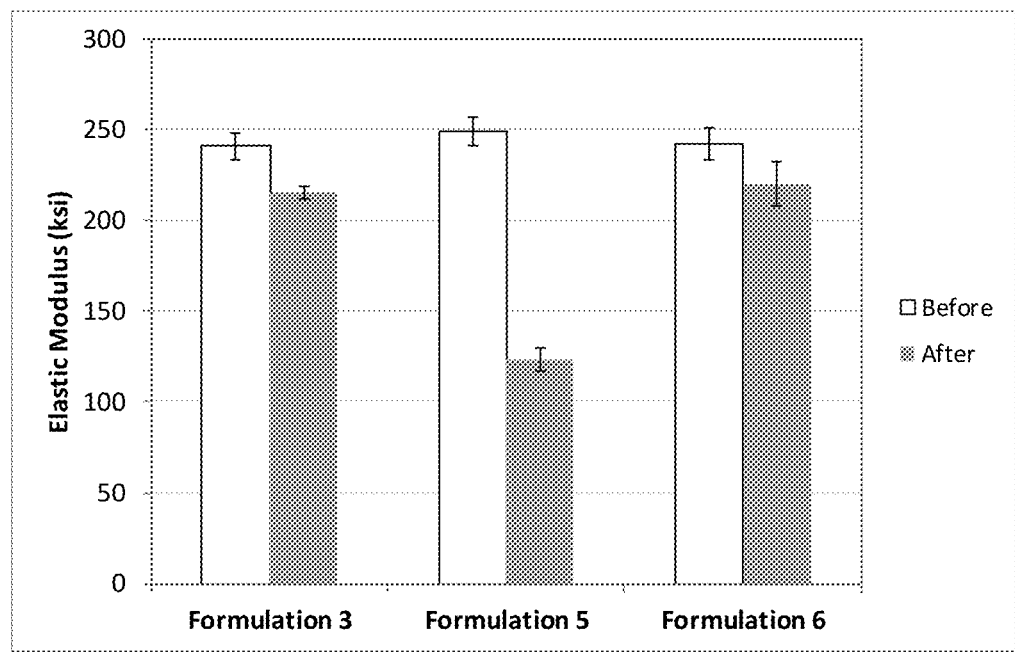

Three point bend testing was employed to measure modulus of elasticity and flexural strength for Formulations 3, 5, and 6. Samples with dimensions of 12 in ×12 in ×1 in (length×width×depth) were tested before and after moisture movement testing. All samples were dried at 60° C. in a circulating air oven for 24 hours before strength testing. No significant difference was observed in flexural strength (FIG. 9) or elastic modular (FIG. 10) before moisture movement testing. Both flexural strength and elastic modulus decreased after moisture movement testing for all formulations, however, the decrease was greatest for the samples prepared without coupling agent (Formulations 3 and 5). This suggests that the presence of a coupling agent slows the rate of hydrolysis upon exposure to water.

Example 3

Six polymer composites (Formulations 7-12) were prepared according to Table 3 and analyzed for moisture movement characteristics; corresponding control samples were also prepared without coupling agent. The polyol mixtures used in Formulations 7-9 had aromaticity values of about 40-50%, and the polyol mixtures of Formulations 10-12 each had an aromaticity of about 10%. Each composite was prepared with MDI, surfactant (2 pphp), and fly ash as the filler.

TABLE 3

| Formulation | Polyols | Coupling agent | Filler |
|---|---|---|---|
| 7 | polyester/Mannich | epoxide silane | 73 % wt |
| 8 | polyester/Mannich | epoxide silane | 73 % wt |
| 9 | polyester/Mannich | epoxide silane | 73 % wt |
| 10 | polyether/polyester/Mannich | aminosilane | 73 % wt |
| 11 | polyether/polyester/Mannich | aminosilane | 73 % wt |
| 12 | polyether/polyester/Mannich | mercaptosilane | 73 % wt |

A rectangular sample of each composite was cut to a size of 12 in ×12 in ×1 in (length×width×depth) to measure moisture movement characteristics. After recording the initial weight of each sample, the samples were submerged in separate containers of DI water maintained at a temperature of 45° C. for a total of 12 days. The samples were then removed from the water, patted dry, and the weight and length measured. Results are summarized in Table 4 ("CA"=coupling agent).

TABLE 4

| For- | Moisture movement | | | Water Uptake | | |
|---|---|---|---|---|---|---|
| mu- | % of initial length | | % re- | % of initial mass | | % re- |
| lation | without CA | with CA | duction | without CA | with CA | duction |
| 7 | 0.1 | 0.046 | 54.4% | 12.93 | 6.21 | 52.0% |
| 8 | 0.15 | 0.078 | 47.5% | 11.61 | 4.82 | 58.5% |
| 9 | 0.21 | 0.14 | 35.2% | 7.06 | 5.21 | 26.2% |
| 10 | 1.31 | 1.12 | 14.5% | 12.8 | 12.4 | 3.1% |
| 11 | 1.31 | 0.47 | 64.1% | 12.8 | 5.54 | 56.7% |
| 12 | 1.31 | 0.33 | 74.8% | 12.8 | 5.33 | 58.4% |

The composites prepared with a coupling agent exhibited less moisture movement and less water uptake as compared to their corresponding controls. These results are consistent with the findings in Example 1.

Example 4

Studies were performed to investigate the effect of different polyols and use of coupling agents on the ability to endure freeze-thaw conditions. Various polyurethane composites were prepared with polyol mixtures varying in aromaticity and hydrophobicity, and with different types of silane coupling agents (e.g., epoxide silane, aminosilane, mercaptosilane). The polyol mixtures varied in aromaticity from about 10%-50% and included different carbon chain lengths to vary hydrophobicity. Composites were prepared with MDI and included fly ash as an inorganic filler (73% wt).

Each type of composite was subjected to freeze-thaw testing of up to 250 cycles, according to ASTM C-666 Procedure B. While all composites met specifications for up to 150 cycles, differences were observed for greater than 150 cycles. Generally, it was found that the composites prepared with polyols having more hydrophobic content exhibited better freeze-thaw properties. The use and type of coupling agent was found to have limited effect.

It is intended that the specification and figures be considered as exemplary only, with a true scope and spirit of the present disclosure being indicated by the following claims.

What is claimed is:

1. A composite material comprising:
   a polyurethane foam comprising a polyester polyol with an aromaticity of 30% to 60% and a Mannich polyol with an aromaticity of 5% to 40%; and
   a plurality of inorganic particles dispersed in the polyurethane foam,
   wherein (a) a sample of the composite material having a length of 48 inches has a moisture movement of less than 0.15% along the length, and/or (b) a sample of the composite material having a length of 6 inches has a moisture movement of less than 0.8% along the length, when the sample is submerged in 45° C. distilled water for 14 days, the moisture movement being the percent difference between a length of the sample before and after submergence in the distilled water.

2. The composite material of claim 1, wherein the polyurethane foam has a crosslink density from 0.1 mol/g to 1 mol/g.

3. The composite material of claim 1, wherein the sample of the composite material having a length of 48 inches, and/or the sample having a length of 6 inches, has a water uptake of 1% to 10% when submerged in 45° C. distilled water for 14 days.

4. The composite material of claim 1, wherein the sample of the composite material having a length of 48 inches has a moisture movement of less than 0.10% along the length, and/or the sample having a length of 6 inches has a moisture movement of less than 0.6% along the length, when submerged in 45° C. distilled water for 14 days.

5. The composite material of claim 1, wherein the composite material has a density from 10 lb/ft3 to 75 lb/ft3.

6. The composite material of claim 1, wherein the inorganic particles comprise fly ash.

7. The composite material of claim 1, wherein the polyurethane foam comprises a silane compound.

8. The composite material of claim 7, wherein the silane compound has the structure:

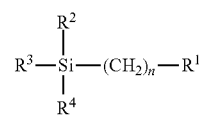

wherein:
R1 is isocyanate, amino, epoxy (oxirane rings), or sulfur (thiols), acrylate, vinyl/olefin, anhydride, carboxylic acid, hydroxyl, dipodal, imide, alkoxy, or cyano; and
R2, R3, and R4 are each independently selected from alkoxy, acyloxy, amine, chloride, and aryl groups.

9. The composite material of claim 7, wherein the silane compound is

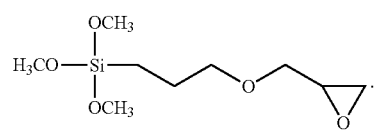 [SMILES: CO[Si](CCCOCC1CO1)(OC)OC]

10. The composite material of claim 1, wherein the composite material has a fire resistance that meets the standards of at least Class B according to ASTM E-84.

11. The composite material of claim 10, wherein the composite material is devoid of a fire retardant.

12. A building material comprising the composite material of claim 1, wherein the building material is selected from the group of siding materials, cladding, trim, beadboard, building panels, sheets, architectural moldings, sound barriers, thermal barriers, insulation, wall boards, ceiling tiles, ceiling boards, soffits, roofing materials, roof tile shingles, roof cover boards, slate panels, shake panels, cast molded products, moldings, sills, stone, masonry, brick products, posts, signs, guard rails, retaining walls, park benches, tables, slats, corner arches, columns, ceiling tiles, and railroad ties.

13. A composite material comprising:
a polyurethane foam comprising a polyester polyol with an aromaticity of 30% to 60%, a Mannich polyol with an aromaticity of 5% to 40%, and an aminosilane compound or a mercaptosilane compound; and
a plurality of inorganic particles dispersed in the polyurethane foam,
wherein (a) a sample of the composite material having a length of 48 inches has a moisture movement of less than 0.15% along the length, and/or (b) a sample of the composite material having a length of 6 inches has a moisture movement of less than 0.8% along the length, when submerged in 45° C. distilled water for 14 days, the moisture movement being the percent difference between a length of the sample before and after submergence in the distilled water; and
wherein the composite material has a fire resistance that meets the standards of Class A according to ASTM E-84.

14. The composite material of claim 13, wherein the composite material is devoid of a fire retardant.

15. The composite material of claim 13, wherein the sample of the composite material having a length of 48 inches, and/or the sample having a length of 6 inches, has a water uptake of 1% to 10% when submerged in 45° C. distilled water for 14 days.

16. The composite material of claim 1, wherein the polyurethane foam comprises an aminosilane compound or a mercaptosilane compound.

* * * * *